United States Patent
Dawood et al.

(10) Patent No.: US 12,341,723 B2
(45) Date of Patent: Jun. 24, 2025

(54) METHODS AND APPARATUSES FOR MANAGING DUTY CYCLE IN WIRELESS LOCAL ACCESS NETWORKS (WLANS)

(71) Applicant: Morse Micro Pty. Ltd., Surry Hills (AU)

(72) Inventors: Bassem Fahmy Tawadros Dawood, Surry Hills (AU); Rene-Cedric Van den Bergh, Surry Hills (AU)

(73) Assignee: Morse Micro Pty. Ltd., Surry Hills (AU)

( * ) Notice: Subject to any disclaimer, the term of this patent is extended or adjusted under 35 U.S.C. 154(b) by 33 days.

(21) Appl. No.: 18/470,686

(22) Filed: Sep. 20, 2023

(65) Prior Publication Data
US 2024/0171358 A1    May 23, 2024

(30) Foreign Application Priority Data
Nov. 17, 2022    (AU) ................ 2022903462

(51) Int. Cl.
*H04L 5/00*    (2006.01)
*H04W 84/12*    (2009.01)

(52) U.S. Cl.
CPC .......... *H04L 5/0055* (2013.01); *H04L 5/0096* (2013.01); *H04W 84/12* (2013.01)

(58) Field of Classification Search
CPC ............... H04W 72/00; H04W 72/566; H04W 72/569; H04W 84/02; H04W 84/10;
(Continued)

(56) References Cited

U.S. PATENT DOCUMENTS

| | | | |
|---|---|---|---|
| 6,950,404 B2 * | 9/2005 | Pearl ............... | H04L 1/1854 370/321 |
| 7,558,232 B2 * | 7/2009 | Pearl ............... | H04L 1/187 370/321 |

(Continued)

FOREIGN PATENT DOCUMENTS

| | | | | |
|---|---|---|---|---|
| CN | 112740802 A | * | 4/2021 | ........... H04L 1/1887 |
| JP | 4718460 B2 | * | 7/2011 | ........... H04L 47/14 |
| WO | WO-2005011199 A2 | * | 2/2005 | ........... H04L 47/14 |

OTHER PUBLICATIONS

X. Wang, X. Wang, G. Xing and Y. Yao, "Dynamic duty cycle control for end-to-end delay guarantees in wireless sensor networks," 2010 IEEE 18th International Workshop on Quality of Service (IWQoS), Beijing, China, 2010, pp. 1-9, doi: 10.1109/IWQoS.2010.5542743 (Year: 2010).*

(Continued)

*Primary Examiner* — Jae Y Lee
*Assistant Examiner* — Nhu Pham
(74) *Attorney, Agent, or Firm* — Polsinelli PC

(57) ABSTRACT

Systems and techniques are provided for performing wireless communications. In some aspects, a wireless communication device can transmit one or more first packets starting from a first time point. The wireless communication device can determine a time-on-air of the one or more first packets, wherein the time-on-air of the one or more first packets is an airtime associated with transmitting the one or more first packets. The wireless communication device can calculate an off-air time corresponding to transmission of the one or more first packets, wherein the off-air time is calculated based on the time-on-air and a duty cycle associated with the wireless communication device. The wireless communication device can delay sending one or more second packets until after a second time point later than the first time (Continued)

point, the second time point determined based on a sum of the first time point, the time-on-air, and the calculated off-air time.

20 Claims, 10 Drawing Sheets

(58) Field of Classification Search
CPC ............ H04W 84/12; H04W 52/0216; H04W 16/14; H04L 5/0091; H04L 5/0092; H04L 5/0094; H04L 5/0096; H04L 5/003; H04L 5/0053; H04L 5/0055; Y02D 30/70
See application file for complete search history.

(56) References Cited

U.S. PATENT DOCUMENTS

| | | | |
|---|---|---|---|
| 7,787,434 B2* | 8/2010 | Nandagopalan | H04W 28/06 455/452.2 |
| 8,000,385 B2* | 8/2011 | Wei | H04W 28/06 375/238 |
| 8,009,658 B2* | 8/2011 | Welborn | H04B 1/7176 370/347 |
| 9,536,580 B2* | 1/2017 | Kang | G11C 7/222 |
| 10,357,158 B2* | 7/2019 | Patel | A61B 5/0024 |
| 10,530,420 B2* | 1/2020 | Turner | H04W 4/80 |
| 10,880,213 B2* | 12/2020 | Ostwal | H04W 52/0229 |
| 10,880,883 B2* | 12/2020 | Bhushan | H04W 72/51 |
| 11,146,362 B2* | 10/2021 | Fu | H04L 1/1864 |
| 11,991,710 B2* | 5/2024 | Liberg | H04W 52/0216 |
| 2008/0170553 A1* | 7/2008 | Montemurro | H04W 28/065 370/338 |
| 2009/0046611 A1* | 2/2009 | Ryu | H04W 52/0216 370/311 |
| 2009/0270030 A1* | 10/2009 | Jia | H04B 1/1615 455/39 |
| 2013/0182622 A1* | 7/2013 | Lin | H04W 52/0251 370/311 |
| 2014/0105063 A1* | 4/2014 | Jeong | H04W 24/02 370/254 |
| 2014/0269635 A1* | 9/2014 | Shapira | H04W 72/52 370/336 |
| 2015/0257168 A1* | 9/2015 | Lu | H04W 28/0268 370/329 |
| 2016/0105902 A1* | 4/2016 | Hirsch | H04W 72/566 370/329 |
| 2016/0234125 A1* | 8/2016 | Phillips | H04L 65/80 |
| 2016/0234126 A1* | 8/2016 | Phillips | H04L 65/765 |
| 2016/0262170 A1* | 9/2016 | Lee | H04W 72/566 |
| 2017/0064727 A1* | 3/2017 | Chrisikos | H04W 72/1215 |
| 2017/0093727 A1* | 3/2017 | Chen | H04W 76/10 |
| 2017/0181127 A1* | 6/2017 | Hampel | H04W 52/18 |
| 2018/0070243 A1* | 3/2018 | Liu | H04W 74/0808 |
| 2018/0124705 A1* | 5/2018 | Su | H04W 52/0277 |
| 2018/0220460 A1* | 8/2018 | Mestanov | H04W 74/0808 |
| 2018/0288789 A1* | 10/2018 | Wang | H04W 72/566 |
| 2021/0227471 A1* | 7/2021 | Chitrakar | H04W 52/0235 |
| 2021/0289545 A1* | 9/2021 | Gorajala Chandra | H04W 28/0215 |
| 2021/0360677 A1* | 11/2021 | Liberg | H04W 72/23 |
| 2022/0039111 A1* | 2/2022 | Alabbasi | H04W 72/566 |
| 2022/0150950 A1* | 5/2022 | Islam | H04W 72/1263 |
| 2022/0417944 A1* | 12/2022 | Xiao | H04W 84/18 |
| 2023/0042904 A1* | 2/2023 | Sevindik | H04L 1/188 |
| 2023/0086527 A1* | 3/2023 | Boger | H04W 72/566 370/329 |
| 2023/0239868 A1* | 7/2023 | Kuo | H04W 72/1268 370/329 |
| 2023/0353806 A1* | 11/2023 | Cao | H04W 72/566 |

OTHER PUBLICATIONS

A. S. Akyurek and T. S. Rosing, "Optimal Packet Aggregation Scheduling in Wireless Networks," in IEEE Transactions on Mobile Computing, vol. 17, No. 12, pp. 2835-2852, Dec. 1, 2018, doi: 10.1109/TMC.2018.2826554 (Year: 2018).*
M. T. Islam, B. Islam and S. Nirjon, "Duty-Cycle-Aware Real-Time Scheduling of Wireless Links in Low Power WANs," 2018 14th International Conference on Distributed Computing in Sensor Systems (DCOSS), New York, NY, USA, 2018, pp. 53-60, doi: 10.1109/DCOSS.2018.00015 (Year: 2018).*
ETSI EN 300 220-2: Short Range Devices (SRD) Operating in the Frequency Range 25 MHz to 1 000 MHz; Part 2: Harmonised Standard for Access to Radio Spectrum for Non Specific Radio Equipment, V0.0.19, Jul. 19, 2022 (Year: 2022).*
ETSI EN 300 220-2: Short Range Devices (SRD) Operating in the Frequency Range 25 MHz to 1000 MHz; Part 2: Harmonized Standard for Access to Radio Spectrum for Non Specific Radio Equipment, V0.0.19, Jul. 19, 2022 (Year: 2022).*

* cited by examiner

METHODS AND APPARATUSES FOR MANAGING DUTY CYCLE IN WIRELESS LOCAL ACCESS NETWORKS (WLANS)

CROSS-REFERENCE TO RELATED APPLICATIONS

This application claims the benefit of Australian Provisional Patent Application No. 2022/903462, filed Nov. 17, 2022 and entitled "METHODS AND APPARATUSES FOR MANAGING DUTY CYCLE In WLAN," which is hereby incorporated by reference, in its entirety and for all purposes.

FIELD

The present disclosure generally relates to wireless communications. For example, aspects of the present disclosure are related to duty cycle management for a transmitting device in a Wireless Local Area Network (WLAN).

BACKGROUND

The concepts of smart cities and smart communities can be realized by the Internet of Things (IoT). Low power wide area networking (LPWAN) technologies have become important in the evolution of IoT, as these LPWAN technologies are an excellent fit to the profile and/or characteristics of IoT data traffic generated and consumed by various smart city applications. For instance, in designing city-scale IoT applications (e.g., such as environment monitoring, road traffic monitoring, facility management, smart parking, street lighting, vehicle tracking, waste management, early detection of wildfire and/or volcano eruption, precision agriculture, and/or home automation, etc.), it is observed that the basic communication requirements in these IoT applications can often include a long radio range and a low power consumption (e.g., a low on-device power consumption), as well as low bandwidth.

Wi-Fi HaLow operates in line with the IEEE 802.11ah standard on sub-1 GHz license-exempt bands to provide extended-range and low-power Wi-Fi networks. These frequency bands may be shared with an enormous number of devices in the wireless local area network (WLAN). Accordingly, in some jurisdictions, there is a regulatory constraint on the time used by a transmitting device using the medium (e.g., also referred to as the "duty cycle" of the transmitting device) for both Wi-Fi HaLow access points (APs) and stations (STAs). More generally, duty cycle (DC) limits can be seen to apply to short range devices (SRDs) operating in a frequency range of approximately 25 megahertz (MHz) to 1,000 Mhz. Current and previous Wi-Fi standards were largely not in this sub-gigahertz band (e.g., did not operate at frequencies less than 1,000 MHz), and were not required to meet duty cycle constraints in the various jurisdictions where duty cycle constraints are imposed on SRDs. Wi-Fi HaLow devices (operating in line with the IEEE 802.11ah standard in sub-gigahertz bands) are considered SRDs that are required to meet the applicable duty cycle constraints for SRDs in the relevant regulatory jurisdictions.

The duty cycle regulatory constraint for Wi-Fi HaLow restricts the percentage of airtime a device (e.g., transmitting device) is allowed to send packets over the medium. For instance, the duty cycle of a Wi-Fi HaLow device is typically between 0.1% to 10%, indicating that a Wi-Fi HaLow device may only transmit between 0.1% to 10% of a given time interval. The time interval over which the duty cycle is measured can also be referred to as an observation period ($T_{obs}$) or a monitor time ($T_{mon}$). For instance, the duty cycle time interval may be equal to one hour (e.g., $T_{obs}=T_{mon}=1$ hr). The duty cycle of a transmitting device can be measured on a per-bandwidth basis. For example, the duty cycle can apply for a certain channel (e.g., certain frequency) that is used by the transmitting device.

Based on the applicable duty cycle limit, a device in a Wi-Fi HaLow network must wait for a certain period of time after each successful transmission (e.g., must wait a certain period of time before a next transmission). For example, given a 10% duty cycle limit, a transmitting device that transmits over a current wireless channel for 1 millisecond (ms) has to wait for another 9 ms before the current wireless channel is available again for further transmission(s). The aim of the duty cycle constraint is to ensure fair access to the air for all connected devices competing for the frequency bands (which in the case of Wi-Fi HaLow devices are license-exempt bands), as Wi-Fi devices typically do not implement or support frequency hopping techniques. The duty cycle constraint needs to be considered in designing real-time IoT systems where a large number of connected devices have to send data wirelessly over a long distance in real-time.

BRIEF SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Disclosed are systems, methods, apparatuses, and computer-readable media for performing wireless communication over a Wireless Local Area Network (WLAN). According to at least one illustrative example, a method of wireless communication over a WLAN is provided. The method includes: transmitting, by a wireless communication device, one or more first packets starting from a first time point; determining a time-on-air of the one or more first packets, wherein the time-on-air of the one or more first packets is an airtime associated with transmitting the one or more first packets; calculating an off-air time corresponding to transmission of the one or more first packets, wherein the off-air time is calculated based on the time-on-air and a duty cycle associated with the wireless communication device; and holding the wireless communication device to send one or more second packets after a second time point, wherein the second time point is determined based on the first time point and a sum of the time-on-air and the calculated off-air time.

In another example, an apparatus is provided that includes a modem (modulator demodulator), at least one memory (e.g., configured to store data and processor readable codes), and at least one processor (e.g., implemented in circuitry) coupled to the modem and at least one memory. The processor is configured to and can: transmit one or more first packets starting from a first time point; determine a time-on-air of the one or more first packets, wherein the time-on-air of the one or more first packets is an airtime associated with transmitting the one or more first packets; calculate an off-air time corresponding to transmission of the one or more first packets, wherein the off-air time is calculated based on the time-on-air and a duty cycle associated with the wireless communication device; and hold the modem to send one or more second packets after a second time point, wherein the second time point is determined based on the first time point and a sum of the time-on-air and the calculated off-air time.

In some aspects, the off-air time corresponding to transmission of the one or more first packets is calculated based on $T_{off}=T_{air}*(1/D-1)$, wherein $T_{off}$ is the off-air time, $T_{air}$ is the time-on-air required to send the one or more first packets, and D is the duty cycle associated with the wireless communication device.

In some aspects, the method further includes: transmitting, by the wireless communication device, the one or more second packets starting from a third time point greater than or equal to the second time point; determining an idle time based on a difference between the second time point and the third time point; determining a time-on-air of the one or more second packets, wherein the time-on-air of the one or more second packets is an airtime associated with transmitting the one or more second packets; calculating an off-air time corresponding to transmission of the one or more second packets, based on the time-on-air of the one or more second packets, the duty cycle associated with the wireless communication device, and the idle time; and holding the wireless communication device to send one or more third packets after a fourth time point, wherein the fourth time point is determined based on the third time point and a sum of the time-on-air and the calculated off-air time of the one or more second packets.

In some aspects, the off-air time corresponding to transmission of the one or more second packets is calculated based on $T_{off}=T_{air}*(1/D-1)-T_{idle}$, wherein $T_{off}$ is the off-air time of the one or more second packets, $T_{air}$ is the time-on-air of the one or more second packets, D is the duty cycle associated with the wireless communication device, and $T_{idle}$ is the idle time.

In some aspects, a value of the idle time is reset after transmitting the one or more third packets.

In some aspects, one or more first packets includes an acknowledgement (ACK) packet; and the wireless communication device waits for at least the off-air time associated with the transmission of the ACK packet following each transmission of an ACK packet by the wireless communication device.

In some aspects, the one or more first packets includes one of a Null Data Packet (NDP), a Beacon, or an ACK packet; the wireless communication device performs early transmission of the one or more first packets by a time amount equal to the early time duration; and the off-air time associated with transmission of the one or more first packets is extended by the time amount equal to the early time duration.

In some aspects, wherein the time-on-air for transmitting the one or more first packets is restricted to be within a maximum time-on-air, such that the time-on-air for transmitting the one or more first packets is less than or equal to the maximum time-on-air.

In some aspects, the maximum time-on-air is determined based on a burst cycle duration and the duty cycle associated with the wireless communication device.

In some aspects, one or more of the burst cycle duration or the maximum time-on-air is determined and configured by an application running on the wireless communication device.

In some aspects, the off-air time corresponding to transmission of the one or more first packets is calculated based at least in part on subtracting the time-one-air for transmitting the first packets from the burst cycle duration.

In some aspects, the duty cycle associated with the wireless communication device corresponds to a duty cycle observation window, and wherein a duration of the duty cycle observation window includes an integer multiple of the burst cycle duration.

In some aspects, the one or more first packets and the one or more second packets are included in a data transmission requiring an airtime greater than the maximum time-on-air; and the data transmission is split into at least a first subset including the one or more first packets and a second subset including the one or more second packets, wherein both transmitting the first subset and transmitting the second subset requires an airtime less than or equal to the maximum time-on-air.

In some aspects, the wireless communication device is silent during the off-air time, such that the wireless communication device does not perform any packet transmissions during the off-air time.

In some aspects, the method further includes: continuously updating an available transmission credit associated with the wireless communication device, wherein the wireless communication device is configured to: transmit any packet type of a plurality of packet types based on a determination that the available transmission credit is greater than a reserved credit associated with the wireless communication device; and transmit only essential packet types of the plurality of packet types based on a determination that the available transmission credit is less than or equal to the reserved credit.

In some aspects, the essential packet types include one or both of associated real-time packets or un-associated real-time packets.

In some aspects, the method further includes continuously updating an available transmission credit associated with the wireless communication device, wherein the wireless communication device is configured to: transmit one or more of associated real-time packets, un-associated real-time packets, or non-essential packets based on a determination that the available transmission credit is greater than an un-associated credit associated with the wireless communication device; transmit one or more of associated real-time packets or un-associated real-time packets based on a determination that the available transmission credit is less than or equal to the un-associated credit; and transmit only associated real-time packets based on a determination that the available transmission credit is less than or equal to a real-time credit associated with the wireless communication device, wherein the un-associated credit is greater than the real-time credit.

In some aspects, the associated real-time packets include one or more of ACK packets or Beacons within a Service Set Identifier (SSID) associated with the wireless communication device or the WLAN; the un-associated real-time packets include one or more of probe responses, association responses, or handshaking messages; and the non-essential packets include one or more of data or management packets.

In some aspects, the wireless communication device spreads a plurality of packet transmissions from the wireless communication device to a receiving device based on transmitting each packet transmission of the plurality of packet transmissions to be at least a minimum duration apart in time; the minimum duration apart includes a calculated time interval to allow the receiving device to accumulate a transmission credit to receive the packet transmissions; and the minimum duration apart is calculated based on the time-on-air of each packet transmission and a duty cycle associated with the receiving device.

In some aspects, the techniques described herein relate to a wireless communication device for performing wireless communication in a Wireless Local Area Network (WLAN), the wireless communication device including: a modem; a processor, communicatively coupled with the modem; and a memory, communicatively coupled with the processor and storing processor-readable codes that, when executed by the processor in conjunction with the modem, is configured to: transmit one or more first packets starting from a first time point; determine a time-on-air of the one or more first packets, wherein the time-on-air of the one or more first packets is an airtime associated with transmitting the one or more first packets; calculate an off-air time corresponding to transmission of the one or more first packets, wherein the off-air time is calculated based on the time-on-air and a duty cycle associated with the wireless communication device; and hold the modem to send one or more second packets after a second time point, wherein the second time point is determined based on the first time point and a sum of the time-on-air and the calculated off-air time.

In some aspects, the techniques described herein relate to a wireless communication device, wherein the wireless communication device is a WLAN Access Point (AP) or a WLAN Station (STA).

Other objects and advantages associated with the aspects disclosed herein will be apparent to those skilled in the art based on the accompanying drawings and detailed description.

BRIEF DESCRIPTION OF THE DRAWINGS

Illustrative aspects of the present application are described in detail below with reference to the following drawing figures.

DETAILED DESCRIPTION

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the spirit and scope of the application as set forth in the appended claims.

Figure 1:
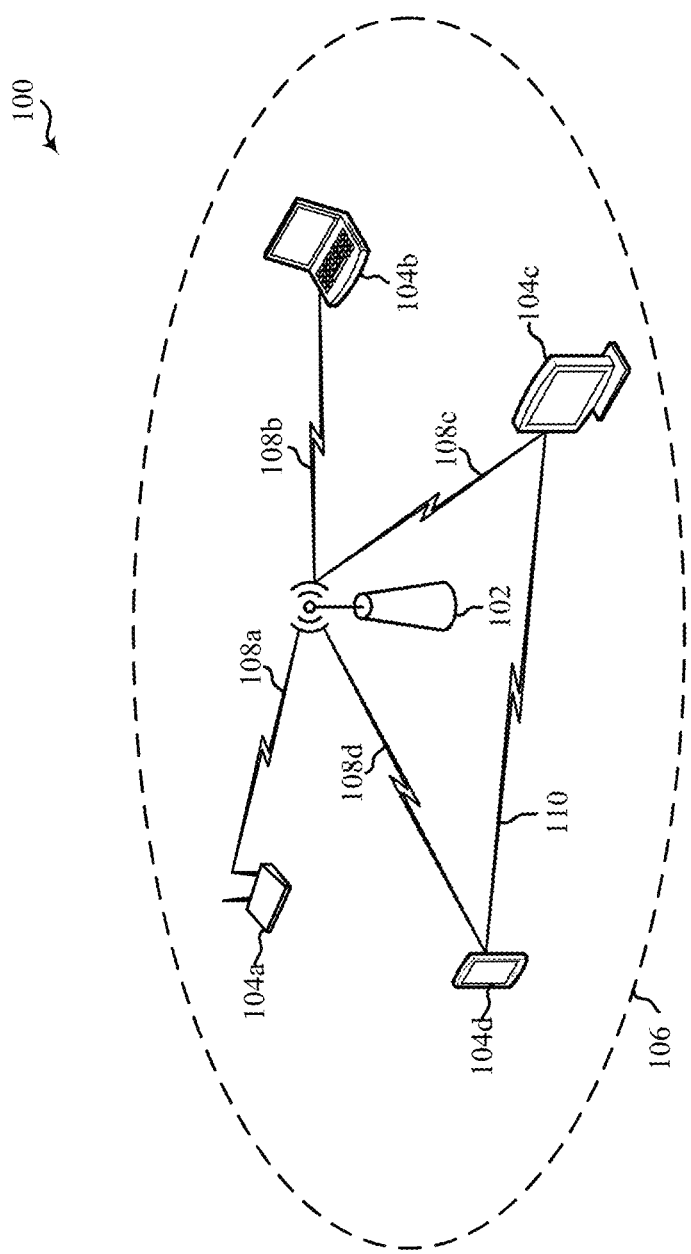
FIG. 1 is a block diagram illustrating an example wireless communication network, in accordance with some examples.

FIG. 1 is a block diagram illustrating an example wireless communication network 100. In some aspects, the wireless communication network 100 can be an example of a wireless local area network (WLAN). As used herein, a WLAN may also be referred to as a Wi-Fi network. In some examples, the WLAN 100 can be a network implementing at least one of the IEEE 802.11 family of wireless communication protocol standards (e.g., such as that defined by the IEEE 802.11-2020 specification or amendments thereof including, but not limited to, 802.11ah, 802.11ay, 802.11ax, 802.11az, 802.11ba and 802.11be). The WLAN 100 may include at least one access point (AP) 102 and multiple associated stations (STAs) 104. For example, the STAs 104 can include a first STA 104*a*, a second STA 104*b*, a third STA 104*c*, a fourth STA 104*d*, etc. While only one AP 102 is shown, the WLAN network 100 also can include multiple APs 102.

Each of the STAs 104*a*-104*d* also may be referred to as a mobile station (MS), a mobile device, a mobile handset, a wireless handset, an access terminal (AT), a user equipment (UE), a subscriber station (SS), and/or a subscriber unit, among other examples. The STAs 104 may represent various devices such as mobile phones, personal digital assistant (PDAs), other handheld devices, netbooks, notebook computers, tablet computers, laptops, display devices (e.g., TVs, computer monitors, navigation systems, etc.), music or other audio or stereo devices, remote control devices ("remotes"), printers, kitchen or other household appliances, key fobs (e.g., for passive keyless entry and start (PKES) systems), etc.

A single AP 102 and an associated set of STAs 104a-104d may be referred to as a basic service set (BSS), which is managed by the respective AP 102. FIG. 1 additionally shows an example coverage area 106 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102.

The AP 102 periodically broadcasts beacon frames ("beacons") including the BSSID to enable any STAs (e.g., such as one or more, or all, of the STAs 104a-104d) within wireless range of the AP 102 to associate (or re-associate) with the AP 102 to establish a respective communication link 108a-108d (e.g., hereinafter also referred to as a "Wi-Fi link"). For example, the first STA 104a can establish a respective communication link 108a with the AP 102, the second STA 104b can establish a respective communication link 108b with the AP 102, the third STA 104c can establish a respective communication link 108c with the AP 102, the fourth STA 104d can establish a respective communication link 108d with the AP 102, etc. The STAs 104a-104d may additionally use the beacon frames broadcast by AP 102 to maintain the respective communication link 108a-108d with the AP 102. For example, the beacons can include an identification of a primary channel used by the respective AP 102 as well as a timing synchronization function for establishing or maintaining timing synchronization with the AP 102. The AP 102 may provide access to external networks to various STAs (e.g., including the STAs 104a-104d) in the WLAN via respective communication links 108 (e.g., including the respective communication links 108a-108d).

To establish the communication links 108a-108d with an AP 102, each of the respective STAs 104a-104d can perform passive or active scanning operations ("scans") on frequency channels in one or more frequency bands. For example, to perform passive scanning, each of the STAs 104a-104d listens for beacons that are transmitted by the AP 102 at a periodic time interval referred to as the target beacon transmission time (TBTT). The TBTT can be measured in time units (TUs). In some examples, one TU may be equal to 1024 microseconds (μs). In some examples, the TBTT can have a default value of 102.4 milliseconds (ms). To perform active scanning, each of the STAs 104a-104d can generate and sequentially transmit probe requests on each channel to be scanned and listens for probe responses from AP 102. Each of the STAs 104a-104d may be configured to identify or select an AP 102 with which to associate (e.g., based on the scanning information obtained through the passive or active scans), and to perform authentication and association operations to establish a respective communication link 108a-108d with the selected AP 102. The AP 102 assigns an association identifier (AID) to each of the STAs 104a-104d at the culmination of the association operations, which the AP 102 uses to track the STAs 104a-104d.

In some cases, one or more (or all) of the STAs 104a-104d may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. In some examples, one or more of the STAs 104a-104d can be covered by more than one AP 102 and can associate with different APs 102 at different times for different transmissions. After association with an AP 102, one or more of the STAs 104a-104d also may be configured to periodically scan its surroundings to find a more suitable AP 102 with which to associate. For example, a given one of the STAs 104a-104d that is moving relative to its associated AP 102 may perform a "roaming" scan to find another AP 102 having more desirable network characteristics (e.g., such as a greater received signal strength indicator (RSSI), a reduced traffic load, etc.).

In some cases, the STAs 104a-104d may form networks without APs 102 or other equipment other than the STAs 104a-104d themselves. One example of such a network is an ad hoc network (e.g., or wireless ad hoc network). Ad hoc networks may alternatively be referred to as mesh networks or peer-to-peer (P2P) networks. In some cases, ad hoc networks may be implemented within a larger wireless network (e.g., such as WLAN 100). In such implementations, while the STAs 104a-104d may be capable of communicating with each other through the AP 102 using the respective communication links 108a-108d, the STAs 104a-104d may also communicate directly with each other (e.g., with other ones of the STAs 104a-104d) using direct wireless links 110. In some examples, two STAs (e.g., of the STAs 104a-104d) may communicate via a direct communication link 110 regardless of whether both STAs 104 are associated with and served by the same AP 102. In such an ad hoc system, one or more of the STAs 104a-104d may assume the role filled by the AP 102 in a BSS. Such a STA (e.g., one or more of the STAs 104a-104d) may be referred to as a group owner (GO) and may coordinate transmissions within the ad hoc network. Examples of direct wireless links 110 can include one or more (or all) of Wi-Fi Direct connections, connections established by using a Wi-Fi Tunneled Direct Link Setup (TDLS) link, and other P2P group connections, etc.

The APs 102 and STAs 104a-104d may function and communicate (e.g., using the respective communication links 108a-108d) according to the IEEE 802.11 family of wireless communication protocol standards (e.g., such as that defined by the IEEE 802.11-2020 specification or amendments thereof including, but not limited to, 802.11ah, 802.11ay, 802.11ax, 802.11az, 802.11ba, and 802.11be). These standards define the WLAN radio and baseband protocols for the physical (PHY) and medium access control (MAC) layers. For example, the APs 102 and STAs 104a-104d transmit and receive wireless communications (e.g., hereinafter also referred to as "Wi-Fi communications") to and from one another in the form of PHY protocol data units (PPDUs) (or physical layer convergence protocol (PLCP) PDUs). The APs 102 and STAs 104a-104d in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Some implementations of the APs 102 and STAs 104a-104d described herein also may communicate in other frequency bands, such as the 6 GHz band, which may support both licensed and unlicensed communications. In some examples, the APs 102 and STAs 104a-104d can communicate using sub-1 GHz unlicensed (e.g., license exempt) frequency bands, such as when implementing 802.11ah. The APs 102 and STAs 104a-104d also can be configured to communicate over other frequency bands such as shared licensed frequency bands, where multiple operators may have a license to operate in the same or overlapping frequency band or bands.

Each of the frequency bands may include multiple sub-bands or frequency channels. For example, PPDUs conforming to the IEEE 802.11 standards and specifications may be transmitted over frequency bands that are divided into multiple 20 MHz channels. In such examples, the PPDUs are transmitted over a physical channel having a minimum bandwidth of 20 MHz, although other channel bandwidths are also possible. In some cases, a larger bandwidth channel can be formed using channel bonding, which bonds together multiple channels each of the minimum bandwidth (e.g., 20 MHz or otherwise).

Each PPDU is a composite structure that includes a PHY preamble and a payload in the form of a PHY service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

Figure 2A:
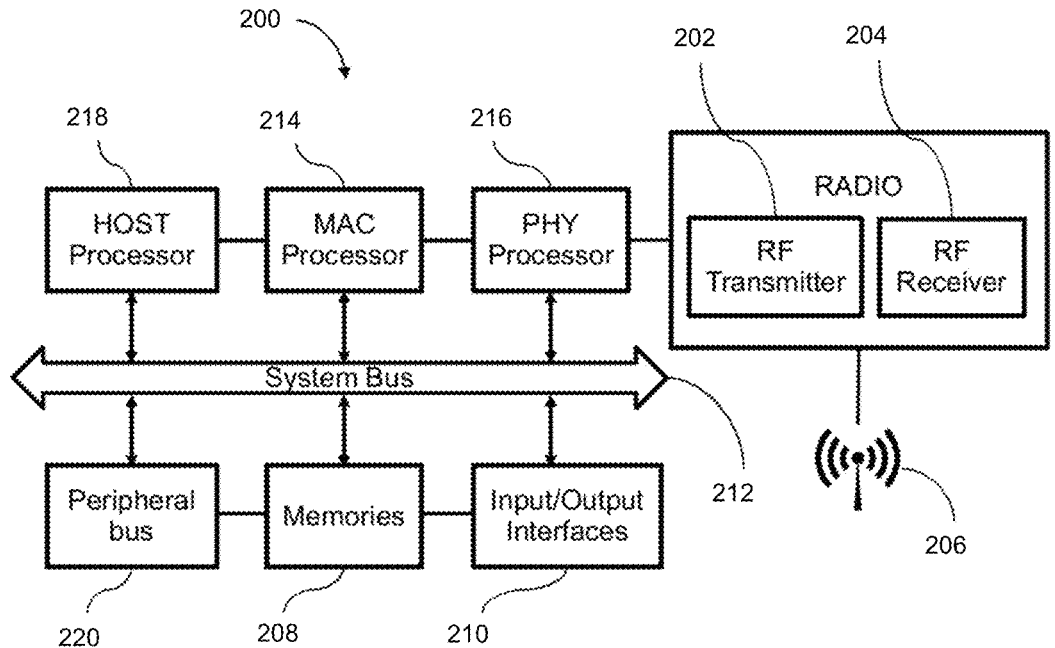
FIG. 2A is a block diagram of a Wireless Local Area Network (WLAN) device that can implement a station (STA) or access point (AP), in accordance with some examples.

FIG. 2A is a high-level block diagram of an example WLAN device 200 that can be used to implement a STA or an AP, in some examples. The example WLAN device 200 can include a MAC layer and a PHY layer in accordance with IEEE 802.11.

WLAN device 200 includes a radio frequency (RF) transmitter module 202, an RF receiver module 204, an antenna unit 206, one or more memory banks 208, input and output interfaces 210, and communication bus 212. The RF transmitter module 202 and the RF receiver module 204 are also known as a modem (modulator-demodulator device), which transmits data by modulating one or more carrier wave signals to encode digital information, as well as receives data by demodulating the signal to recreate the original digital information. As illustrated, WLAN device 200 further includes a MAC processor 214, a PHY processor 216 and a HOST processor 218. These processors can be any type of integrated circuit (IC) including a general processing unit, an application specific integrated circuit (ASIC) or RISC-V based ICs, amongst others.

The memory 208 can be used to store software and/or computer-readable instructions, including software (and/or computer-readable instructions) that can be used to implement at least some functions of the MAC layer. For example, each processor included in the WLAN device 200 (e.g., MAC processor 214, PHY processor 216, HOST processor 218, etc.) executes respective software to implement the functions of the respective communication/application layer.

The PHY processor 216 includes a transmitting signal processing unit and a receiving signal processing unit (not shown) and can be used to manage the interface with the wireless medium (WM). The PHY processor 216 operates on PPDUs by exchanging digital samples with the radio module which includes the RF transmitter 202, the RF receiver 204, analog-to-digital converters, and digital filters.

The MAC processor 214 executes MAC level instructions and manages the interface between the STA application software and the WM, through the PHY processor 216. The MAC processor 214 is responsible for coordinating access to the WM so that the Access Point (AP) and STAs in range can communicate effectively. The MAC processor 214 adds header and tail bytes to units of data provided by the higher levels in the STA and sends them to the PHY layer for transmission. The reverse happens when receiving data from the PHY layer. If a frame is received in error, the MAC processor 214 manages the retransmission of the frame.

The HOST processor 218 interfaces with the MAC layer and is responsible for running higher level functionalities of the STA.

The PHY processor 216, the MAC processor 214, the HOST processor 218, the peripheral bus 220, the memories 208, and the input/output interfaces 210 communicate with each other via the peripheral bus 212. The peripheral bus 220 connects to a number of peripherals that support core functions of the WLAN device 200, including timers, interrupts, radio/filters/system registers, counters, UART, GPIO interfaces, among others. The memory 208 may further store an operating system and applications. In some examples, the memory may store recorded information about captured frames and packets. The input/output interface unit 210 allows for exchange of information with a user of the STA. The antenna unit 206 can include a single antenna and/or can include or multiple antennas. For example, multiple antennas can be used to implement Multiple Input Multiple Output (MIMO) techniques, among others.

Figure 2B:
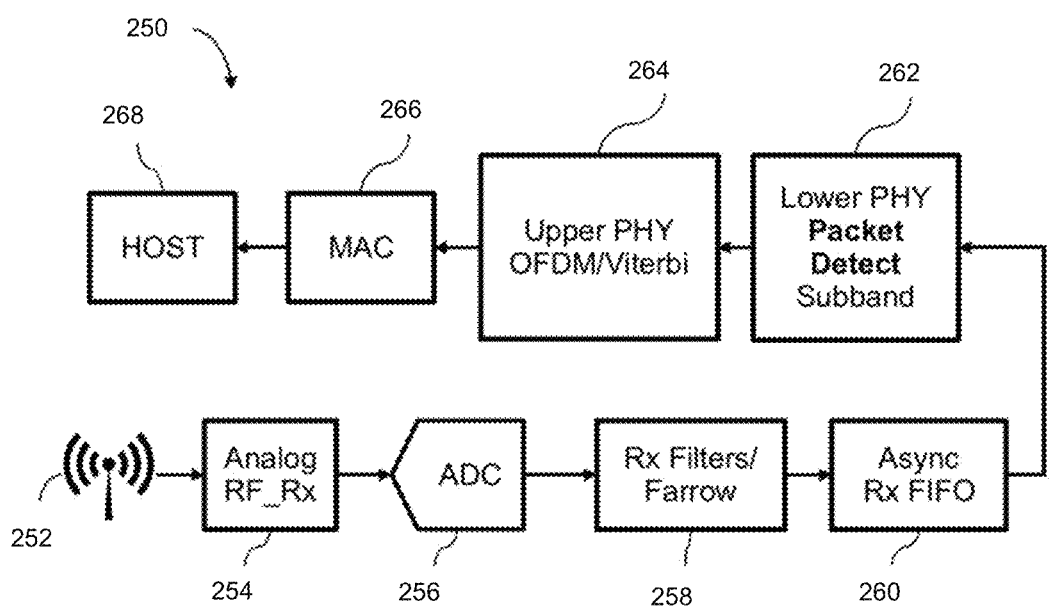
FIG. 2B is a schematic block diagram of the receiver data flow architecture of the WLAN device of FIG. 2A, in accordance with some examples.

FIG. 2B illustrates a schematic block diagram of a receiver data flow architecture 250 that can be used to receive Wi-Fi packets over the network. In one illustrative example, the receiver data flow architecture 250 illustrated in FIG. 2B can correspond to or otherwise be associated with the WLAN device 200 illustrated in FIG. 2A. In some aspects, radio signals are received over the WM and translated into electrical signals by the receiving antenna 252 (e.g., which can be the same as or similar to antenna 206). The received signal is conditioned using a series of analog filters 254 (e.g., depicted as analog RF receive (Rx) filters) before being converted into a digital signal equivalent using an analog-to-digital converter (ADC) 256. The sampled signal output of ADC 256 is conditioned again using a filter bank 258, which can include one or more digital RF filters and/or a farrow, before the samples are collected in an asynchronous receiving first-in-first-out (FIFO) data structure 260.

Samples in FIFO structure 260 can be accessed by a plurality of modules. For example, FIFO 260 can be accessed by a packet detect module and a sub-band module, both of which may be included in the lower-level PHY portion 262 depicted in FIG. 2B. In some aspects, the lower-level PHY portion 262 is itself included in the PHY processor 216 illustrated in FIG. 2A.

The packet detect module included in the lower-level PHY portion 262 can include hardware and/or implement algorithms that can be used to analyze the initial sections of the PHY protocol data unit (PPDU) in the time domain. Based on the analysis, the packet detect module can be used to recognize a received 802.11 frame and synchronize frequency and timing of the STA with the packet being received. The sub-band module included in the lower-level PHY portion 262 can include hardware and/or implement algorithms that can be used to detect which subchannel in the allocated frequency band is being used by the AP for the packet being received.

Once a packet is detected and the relevant subchannel is established, samples can be forwarded to an upper-level PHY portion 264. The upper-level PHY portion 264 (and the lower-level PHY portion 262) can be included in the PHY processor 216 illustrated in FIG. 2A. In some aspects, upper-level PHY portion 264 can be used to process and decode OFDM symbols (e.g., with the support of a coprocessor module) to reconstruct the full PPDU. The reconstructed PPDU is output by the upper-level PHY portion 264 and subsequently processed by the MAC layer processor 266. MAC layer processor 266 can be used to extract the data payload from the PPDU and provide the relevant information to the HOST layer 268 for consumption.

In some examples, the MAC layer processor 266 illustrated in FIG. 2B can be the same as or similar to the MAC processor 214 illustrated in FIG. 2A. In some cases, the HOST layer 268 illustrated in FIG. 2B can include or otherwise can be the same as or similar to the HOST processor 218 illustrated in FIG. 2A.

A WLAN (e.g., such as WLAN 100) can utilize different frame types and frame structures for performing wireless communications. For example, a Wi-Fi network can utilize management frames, control frames, and data frames. Management frames can be used to manage a BSS, control frames can be used to control access to the physical transmission medium, and data frames can be used to transmit payload data. Each Wi-Fi frame can include a Media Access Control (MAC) header, a payload, and a tailer (e.g., a frame check sequence (FCS)). In some cases, a Wi-Fi frame may be generated (e.g., transmitted, received, etc.) without including a payload. In some examples, the first two bytes of the MAC header can be indicative of a frame control field specifying the form and function of the frame. For example, the frame control field can include one or more bits indicative of the type of the associated Wi-Fi frame (e.g., management frame, control frame, data frame). In one illustrative example, the frame control field can include two bits that are indicative of the frame type of the Wi-Fi frame that includes the MAC header (e.g., which itself includes the frame control field bits). The MAC header of a Wi-Fi frame can additionally include a sequence control field. The sequence control field is a two-byte section that can be used to indicate or identify message order and/or to eliminate duplicate frames.

Management frames can be used for the maintenance, or discontinuance, of communication between an AP and a STA. For example, beacon frames are a type of management frame that contain all of the information about the Wi-Fi network (or other WLAN with which the beacon is associated). Beacon frames are transmitted periodically and have a number of functions, including the announcement of the presence of a WLAN, synchronizing the members of a service set, and signaling the presence of buffered data traffic for members of the service set.

As noted previously, Wi-Fi HaLow devices operate in line with the IEEE 802.11ah standard over the 900 MHz licenseexempt bands to provide extended-range and low-power Wi-Fi networks. Wi-Fi HaLow devices can include APs and STAs, among various other types of devices. As Wi-Fi HaLow devices are considered short range devices (SRDs) that operate in the sub-gigahertz frequency range, certain regulatory regimes and jurisdictions impose duty cycle constraints that limit the amount or percentage of time that a device may transmit during a given time interval.

Figure 3:
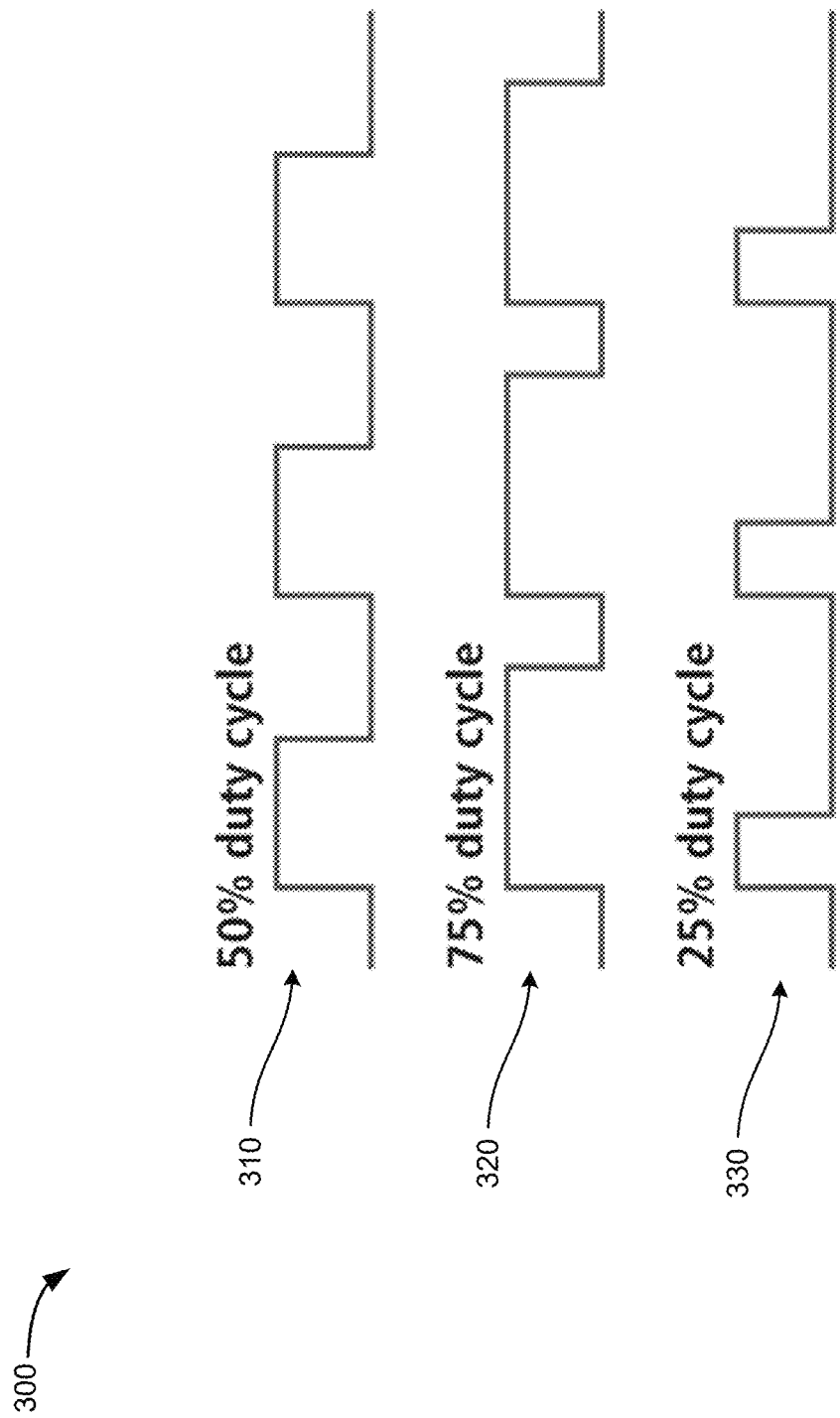
FIG. 3 is a diagram illustrating an example of different duty cycle values, in accordance with some examples.

FIG. 3 is a diagram 300 illustrating an example of different duty cycle values, in accordance with some examples. Duty cycle can be determined as the ratio of time a load or circuit is on compared to the time the load or circuit is off. In the context of a wireless communication device, the duty cycle can be determined as the ratio of time the device is transmitting over a wireless medium as compared to the time the device is not transmitting over the wireless medium. For instance, the graph 310 depicts an example of a 50% duty cycle; the graph 320 depicts an example of a 75% duty cycle; and the graph 330 depicts an example of a 25% duty cycle. In each of the three graphs 310-330, the horizontal axis represents time and the vertical axis represents the transmission state (e.g., with a higher or greater value indicating transmission is occurring, and a lower or smaller value indicating transmission is not occurring). In the 50% duty cycle example 310, the device alternates between transmitting (high) and not transmitting (low) such that equal amounts of time are spent in the transmitting state and the not transmitting state. In the 75% duty cycle example 320, the device alternates between transmitting (high) and not transmitting (low) such that 75% of the time is spent in the transmitting state and 25% of the time is spent in the not transmitting state. In the 25% duty cycle example 330, the device alternates between transmitting (high) and not transmitting (low) such that 25% of the time is spent in the transmitting state and 75% of the time is spent in the not transmitting state.

As used herein, the term "duty cycle" can be used interchangeably with "transmission duty cycle." The European Telecommunications Standards Institute (ETSI) defines the duty cycle (DC) as a ratio expressed as a percentage, of the cumulative duration of transmissions $T_{on\_cum}$ within an observation interval $T_{obs}$, wherein the duty cycle DC is given as $$DC = \left(\frac{T_{on\_cum}}{T_{obs}}\right)_{F_{obs}}$$

on an observation bandwidth $F_{obs}$. In the ETSI specification of the duty cycle, the observation interval $T_{obs}$ is assigned a default value of one hour and the observation bandwidth $F_{obs}$ is the operational frequency band of the device for which the duty cycle is being measured. The ETSI definition of duty cycle applies to short range devices (SRDs) operating in the frequency range of 25 MHz to 1000 MHz (e.g., 1 GHZ). The duty cycle DC is determined and/or measured on a pre-frequency or per-channel basis. For instance, if a device may communicate using two different frequencies/channels, a separate duty cycle value is measured for each of the two different frequencies/channels. When applicable, a STA can utilize frequency hopping (e.g., jumping between channels, or otherwise using multiple different channels for a transmission) to continue sending data without any performance degradation. However, Wi-Fi standards (e.g., 802.11b, g, n, ah, etc.) do not implement frequency hopping—a Wi-Fi device typically uses a single frequency/channel, which has a corresponding single DC value measurement.

As used herein, the duty cycle "DC" can also be referred to as the duty cycle "D." The observation interval $T_{obs}$ may be the same as or similar to a monitor time $T_{mon}$ (e.g., $T_{obs}=T_{mon}=1$ hr, or various other pre-determined time interval values). The transmission duration $T_{on}$ can be the same as or similar to the airtime $T_{air}$ (e.g., as used herein, $T_{on\_cum}$ can be the same as or similar to $T_{air}$).

Devices operating in the sub-gigahertz bands (e.g., such as Wi-Fi HaLow devices, among various others) are subject to various coexistence regulations set by the relevant authorities in a given jurisdiction. For instance, these coexistence regulations often include one or more duty cycle constraints for devices operating in sub-gigahertz bands.

The aim of the duty cycle constraint is to ensure fair access to the air for all connected devices competing for the frequency bands.

For example, the duty cycle (D) constraint in European countries is 10% for APs and 2.8% for STAs. In Japan, the duty cycle constraint is 10% for both APs and STAs. In order to be conformant to the duty cycle constraint, an observation window having a length equal to an observation period is used to measure an accumulated transmission time, where the ratio of the accumulated transmission time to the length of the observation window/period must be less than the duty cycle percentage (e.g., the duty cycle limit). Because the start of each observation window may be undefined, the percentage of airtime used by each AP or STA to transmit packets often must be less than the duty cycle constraint within the observation window starting from any time. In other words, a 10% duty cycle constraint may be associated with an observation window $T_{obs}$=1 hr, meaning that an AP or STA cannot transmit for greater than 10% of the one-hour long observation window $T_{obs}$. In some implementations, because the start of the observation window $T_{obs}$ is undefined, the duty cycle constraint can be met by ensuring that the AP or STA does not transmit for greater than 10% of any arbitrarily selected one-hour window. In general, the observation period is relatively long compared to the packet transmission time, for example, the observation period is set to one hour according to some regulations, such as those provided by ETSI. However, it is noted that the example of $T_{obs}$=1 hr is chosen for purposes of illustration and example, and is not intended to be construed as limiting.

Wi-Fi devices that operate in line with current or past standards such as IEEE 802.11b, g, n, ac, ax, etc., operate in the gigahertz frequency bands (e.g., 2.4 GHz, 5 GHZ, 6 GHz, 60 GHz, etc.) and therefore are non-SRD devices and are not subject to the DC limits and constraints that are imposed on sub-gigahertz SRD devices. By comparison, Wi-Fi HaLow and/or other devices operating in line with IEEE 802.11ah are SIG devices that operate in the sub-gigahertz bands less than 1,000 MHz, and are considered SRD devices that should meet the ETSI SRD standard (and/or associated duty cycle limits or constraints). Because IEEE 802.11ah does not implement frequency hopping technology, Wi-Fi HaLow APs and STAs are truly limited to 10% and 2.8% duty cycle limits, respectively.

In some cases, adherence to duty cycle limits can result in a blockage of transmissions. For example, given a 10% duty cycle limit, a transmitting device (e.g., an AP) that transmits over its current wireless channel for 1 ms must wait for another 9 ms before the current wireless channel is available again for further transmission (e.g., to maintain a 10% duty cycle limit, every 1 ms of transmission requires 9 ms of non-transmission, based on 1 ms/(1 ms+9 ms)=0.1=10%). Longer transmissions can result in the accumulation of longer intervals of non-transmission, if the device is to meet the applicable duty cycle limit. For instance, an AP that transmits for 10 ms must subsequently wait for 90 ms before its current wireless channel becomes available again for further transmission, an AP that transmits for 50 ms must subsequently wait for 450 ms before the current wireless channel is available again, etc.

The wait time associated with meeting duty cycle limits (e.g., the time in which a device does not transmit, in order to remain below its duty cycle limit) can result in the blockage of one or more transmissions from the device, as the device queues or schedules transmissions until after the duty cycle wait time has expired (e.g., in the examples above, until after the expiration of the 9 ms, 90 ms, or 450 ms wait times corresponding to an earlier 1 ms, 10 ms, or 50 ms transmission). A total blockage of transmission due to duty cycle limits can result in the disconnection of devices from the BSS. For instance, some transmissions are time-sensitive or otherwise cannot be delayed until the expiration of the duty cycle wait time. Such transmissions can include, but are not limited to, beacons, keep-alive signals, etc.

Described herein are systems and techniques for providing duty cycle scheduling algorithms that can be used to guarantee a respected duty cycle constraint while achieving maximum utilization of a wireless communication medium. In some aspects, the systems and techniques described herein can be used to adhere to duty cycle requirements while also still maintaining a connection (when required). In some embodiments, the systems and techniques described herein can be used to adhere to duty cycle requirements while enable certain packets to be prioritized and sent early at certain intervals to maintain a connection and/or working setup.

Described below are various approaches to duty cycle scheduling (e.g., duty cycle scheduling algorithms). The duty cycle scheduling and/or duty cycle scheduling algorithms described herein can also be referred to as implementing "duty cycle aware packet transmission" or "duty cycle aware transmission." As will be described in greater detail below, the systems and techniques for duty cycle scheduling can be configurable to address multiple and/or different use cases. For instance, the duty cycle scheduling can be implemented and/or configured based at least in part on factors such as a device type (e.g., IoT device, camera, sensor, etc.), a type of data generated or transmitted by the device (e.g., image data, audio data, numerical data or other sensor data, etc.), and/or a periodicity of the data generated or transmitted by the device. For instance, different duty cycle scheduling can be utilized to ensure that an IoT camera configured to send a single image every day meets duty cycle limit requirements as compared to the duty cycle scheduling utilized to ensure that an IoT sensor sending temperature readings every 10 seconds meets duty cycle limit requirements, etc.

It is noted that the systems and techniques described herein for improved duty cycle scheduling can be implemented for wireless communication devices that include, but are not limited to, Wi-Fi HaLow devices (e.g., APs, STAs). Additionally, it is noted that the systems and techniques for improved duty cycle scheduling can be used to implement single packet transmissions, burst transmissions (e.g., transmission of two or more packets), and/or a combination of the two. In some aspects, a single packet transmission can be understood to be an implementation of a burst transmission using a burst size of one packet.

Example Burst Mode Duty Cycle Algorithm

Figure 4:
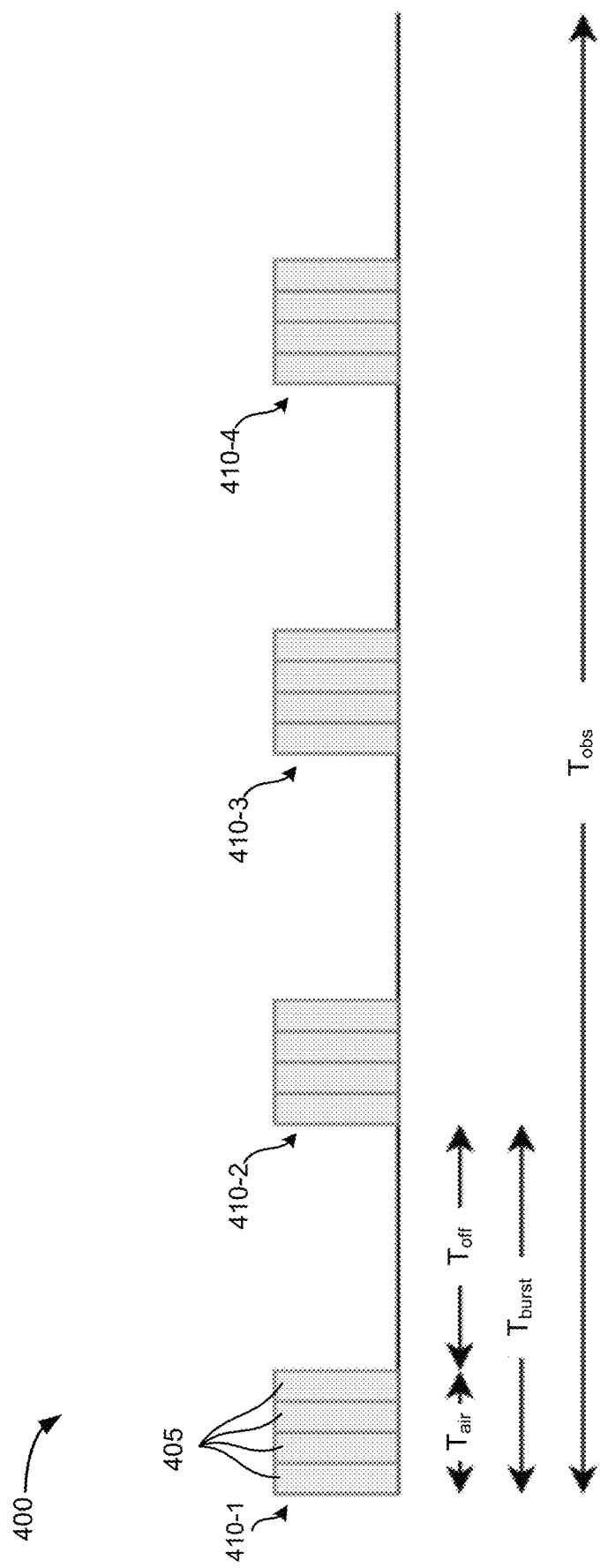
FIG. 4 is a diagram illustrating an example of packet transmission using a plurality of burst periods per duty cycle observation time, in accordance with some examples.

FIG. 4 is a diagram illustrating an example of duty cycle aware packet burst transmission 400, using a plurality of burst periods ($T_{burst}$) per duty cycle observation time ($T_{obs}$), in accordance with some examples. In one illustrative example, the duty cycle observation time $T_{obs}$ can be equal to one hour. As noted previously, in at least some cases, $T_{obs}$ can also be referred to as a monitor time $T_{mon}$ (e.g., $T_{obs}=T_{mon}$). $T_{obs}$ may be referred to interchangeably as a duty cycle "observation time" and/or a duty cycle "observation window."

In some aspects, $T_{obs}$ can be split or otherwise divided into an integer quantity of burst periods. Each burst period is $T_{burst}$ in length and can be used for the burst transmission of one or more packets. For instance, the one-hour $T_{obs}$ can be split into 60 one-minute burst periods $T_{burst}$, such that $T_{obs}=n*T_{burst}$.

Each burst period $T_{burst}$ can comprise a continuous transmission time $T_{air}$ followed by an off-air time $T_{off}$. The continuous transmission time $T_{air}$ can also be referred to as an "on-air time" and/or a "time-on-air." In other words, according to the example burst mode duty cycle algorithm, data can be sent in a burst followed by an off-air duration. The combination of the on-air burst $T_{air}$ and the off-air time $T_{off}$ can be referred to as a burst cycle. In some embodiments, a burst cycle itself can be configured and managed to satisfy the duty cycle regulation requirements (e.g., to meet the duty cycle percentage limit D).

In some aspects, burst cycles can be repeated sequentially. Burst cycles can be configurable depending on the use case, and can vary from an extremely small burst cycle (e.g., a single packet transmission algorithm) to a much larger (e.g., several hundred ms) burst of data. If a burst cycle comprises a transmission duration given by $T_{air}$, followed by the off-air duration $T_{off}$, then the off-air time $T_{off}$ can be configured to be sufficiently long enough in duration to meet the duty cycle requirement D, based on:

$$T_{off} = T_{air} + \frac{1}{D-1} \qquad \text{Eq. (1)}$$

$$T_{burst} = T_{air} + T_{off} \qquad \text{Eq. (2)}$$

For instance, given a 10% duty cycle (e.g., such as the 10% duty cycle limit for a Wi-Fi HaLow or SRD AP), Eqs. (1) and (2) can be used to determine that a one-minute burst period (e.g., $T_{burst}=1$ min) is split into six seconds of transmission time (e.g., $T_{air}=6$ sec) followed by 54 seconds of off-air time (e.g., $T_{off}=54$ sec).

FIG. 4 depicts an example in which four burst periods 410-1, 410-2, 410-3, and 410-4 are configured for a given observation window $T_{obs}$ (although it is noted that a greater or lesser quantity of burst periods $T_{burst}$ can be associated with an observation window $T_{obs}$, without departing from the scope of the present disclosure). Each of the four burst periods 410-1-410-4 can have the same burst period length $T_{burst}$, comprising the on-air time $T_{air}$ and the off-air time $T_{off}$. Each burst period $T_{burst}$ can be used to transmit one or more packets during the corresponding on-air time $T_{air}$ for the burst period. For instance, $T_{air}$ of first burst period 410-1 can be used to transmit one or more packets; $T_{air}$ of the second burst period 410-2 can be used to transmit one or more packets; etc.

In the example of FIG. 4, each burst period 410-1-410-4 is used to transmit a plurality of packets 405 (e.g., a multi-packet burst transmission). However, it is also noted that one or more (or all) of the burst periods 410-1-410-4 may be used to transmit a single packet 405 (e.g., a single-packet "burst" transmission). In some aspects, each burst period 410-1-410-4 can be used to transmit the same number of packets (e.g., in the example of FIG. 4, each burst period can be used to transmit a corresponding four packets 405). In some examples, some (or all) of the burst periods 410-1-410-4 can be used to transmit a different quantity of packets as compared to some (or all) of the remaining burst periods.

In some embodiments, the on-air time $T_{air}$ of a given burst period $T_{burst}$ is subsequent to the off-air time $T_{off}$ of an immediately preceding burst period (e.g., the sequence $T_{burst\_1}, T_{burst\_2}, \ldots$ may correspond to $T_{air\_1}, T_{off\_1}, T_{air\_2}, T_{off\_2}, \ldots$ ). In some embodiments, the consecutive burst transmissions are never closer than $T_{burst}$, even if the previous burst transmission did not fully utilize the maximize permissible on-air time $T_{air}$ given the duty cycle limit D. For instance, the maximum permissible on-air time within a burst period $T_{burst}$ that is subject to a duty cycle limit of D=10% is $T_{air}=6$ sec. In some embodiments, each of the burst periods 410-1-410-4 may be used for a burst transmission of a plurality of packets that fully utilizes the $T_{air}$ of 6 seconds, in which case the first packet 405 of first burst period 410-1 is separated from the first packet 405 of second burst period 410-2 by the time $T_{burst}$.

When consecutive burst transmissions are implemented using an enforced minimum separation of $T_{burst}$, the first packet 405 of first burst period 410-1 is separated from the first packet 405 of second burst period 410-2 by at least the time $T_{burst}$, even if first burst period 410-1 does not fully utilize the full duration of $T_{air}=6$ sec (e.g., if first burst period 410-1 transmits only a single packet 405 and uses only a portion of the window $T_{air}=6$ sec, the first packet 405 of second burst period 410-2 will still be separated from the first packet 405 of first burst period 410-1 by at least the time $T_{burst}$).

In some aspects, following Eq. (1) and enforcing a minimum separation of $T_{burst}$ between consecutive burst cycles can be seen to guarantee that the duty cycle limit (e.g., D) is respected in any monitor period or observation window $T_{obs}$. Recall that the monitor/observation time $T_{obs}$ is a random point in time during which the transmission of a given device is monitored (for duty cycle purposes) for a fixed duration such as one hour. Despite being duty cycle compatible, tiling burst cycles can be challenging and may result in over-transmission (e.g., exceeding the duty cycle limit D) within a given monitor cycle $T_{obs}$. In some embodiments, the below restrictions can be implemented to ensure an always in limit transmission.

First, the observation time $T_{obs}$ can be set as an integer multiple of the burst duration $T_{burst}$:

$$T_{obs}=n \cdot T_{burst} \qquad \text{Eq. (3)}$$

where n is an integer value. A non-integer burst cycle (e.g., within the observation time $T_{obs}$) can result in an over-transmission, wherein to meet the duty cycle limit/requirement, the last burst requires more off-air time than is provided. For instance, when a non-integer burst cycle is used, the observation window $T_{obs}$ may be randomly chosen such that, while there is no further transmission following the last burst of the observation window $T_{obs}$, the choice of $T_{obs}$ is made such that $T_{obs}$ does not include the off-air time following the last burst. In this example, the observation window $T_{obs}$ corresponds to an over-transmission in which the duty cycle limit is exceeded.

Second, burst cycles should be separated by at least $T_{burst}$, independent of the size of the burst transmission within the $T_{air}$ of each burst cycle. This is because transmissions that are closer in time than $T_{burst}$ may result in extra transmission within the monitor time. Based on the observation above, Eq. (2) can be rewritten as:

$$T_{burst} \geq T_{air} + T_{off} \qquad \text{Eq. (4)}$$

Using Eq. (4) to implement the example burst mode duty cycle algorithm implies that even if a burst cycle transmission does not occupy the full $T_{air}$ time that is available given the duty cycle limit D, the device should wait until the full $T_{burst}$ time has passed before performing any re-transmission or subsequent transmission.

In other words, the separation between the first packet of a first burst cycle and the first packet of a second burst cycle can be configured to always be equal to $T_{burst}$. In one illustrative example, the separation between the last packet of a first burst cycle and the first packet of a second burst cycle can be configured to always be equal to $T_{off}$, where $T_{off}=T_{burst}-T_{air\_actual}$. $T_{air\_max}$ represents the maximum possible on-air time for the burst cycle duration $T_{burst}$ and given the duty cycle limit D. For instance, consider the example above where $T_{air}=10$ ms and $T_{off}=90$ ms for a burst cycle with $T_{burst}=100$ ms. Here, $T_{air}=10$ ms=$T_{air\_max}$, as 10 ms is the maximum possible on-air time for a 100 ms burst cycle and a 10% duty cycle limit. $T_{air\_actual}$ represents the on-air time that is actually used by the device during a given burst cycle, where $T_{air\_actual}$ is less than or equal to $T_{air\_max}$. Accordingly, for burst cycles where there is not enough data to fill the full 10 ms of $T_{air\_max}$, the device may send only (for example), data for $T_{air\_actual}=5$ ms. In this example, the next burst cycle should not start until after the device waits for $T_{off}=100$ ms–5 ms=95 ms, even though Eq. (1) would otherwise dictate that the device need only wait for $T_{off}=50$ ms for the $T_{air\_actual}$ of 5 ms.

In some embodiments, a burst cycle (comprising a full cycle of $T_{air}$ and $T_{off}$) can be configurable based on the configurable duty cycle parameter $T_{burst}$, used to characterize the duration of a burst cycle. Using different values of $T_{burst}$, the example burst mode duty cycle algorithm can be adjusted and adapted to address different use cases. For instance, in some embodiments, the burst duration $T_{burst}$ can be configured based on a use case or other information associated with a particular wireless communication device. In one illustrative example, a smart temperature sensor can have a different burst cycle configuration than a camera. The smart temperature sensor may wake up frequently (e.g., every few milliseconds) to send a small packet of data (e.g., carrying temperature data). The camera may wake up infrequently (e.g., every few hours) to capture and transmit a snapshot image data. Duty cycle requirements may differ between the example of the smart temperature sensor and the camera. While the temperature sensor may suffice by sending a single packet of a multi-packet temperature reading, and then waiting for the next available duty cycle to send the next packet of the multi-packet temperature reading, such an approach would not be optimal for the example of the camera, as transmitting the relatively large image data as a series of single packets each followed by some $T_{off}$ duration waiting for the next available duty cycle may result in long total transmission times. For instance, a more optimal approach for the example of the camera can be for the camera to utilize a much more compact (e.g., burst) transmission that is followed by a single, longer wait interval.

In other words, depending on the intended use case of a wireless communication device, the burst cycle length $T_{burst}$ can be configured to vary from a very small (e.g., per packet) duration to a relatively large (e.g., more bursty) time duration. For instance, a connected sensor that is used to send a small amount of data can be configured to implement very short, very fast bursts (e.g., 10 ms of Tx/$T_{air}=10$ ms, followed by 90 ms off-air/$T_{off}=90$ ms, for a burst duration of $T_{burst}=100$ ms). A camera sensor sending an image may need a longer burst (e.g., 500 ms of Tx/$T_{air}$ followed by 4,500 ms of off-air/$T_{off}$, for a burst duration of $T_{burst}=5,000$ ms=5 sec). In another example, an AP sending a beacon every 100 ms may set $T_{burst}=100$ ms (e.g., 10 ms of beacon and data Tx/$T_{air}$ followed by off-air/$T_{off}$ for 90 ms).

In some embodiments, both $T_{air}$ and $T_{burst}$ can be configurable parameters based on the application and/or use case of the wireless communication device that implements the example burst mode duty cycle scheduling algorithm. For instance, the systems and techniques can determine or configure the burst cycle duration $T_{burst}$ first, based on the observation/monitor time $T_{obs}$. In one illustrative example, given an observation/monitor time of $T_{obs}=1$ sec, the observation window $T_{obs}$ can be split into 10 bursts of $T_{burst}=100$ ms each. Within each 100 ms burst cycle, there is a further split to 10% transmission time and 90% off-air time, such that $T_{air\_max}=10$ ms and $T_{off}=T_{burst}-T_{air\_actual}$.

In a first scenario, the device may have a quantity of packets queued for transmission that would exceed the transmission time of $T_{air\_max}=10$ ms that is available for the current burst cycle of $T_{burst}=100$ ms. In this case, the queued packets for transmission can be split into groups or subsets of packets that correspond to 10 ms of transmission each (or less), such that each group or subset of the queued packets for transmission can fit within the $T_{air\_max}=10$ ms that is available in a given burst cycle $T_{burst}=100$ ms. For instance, if there is 50 ms of queued packets for transmission, the queued packets for transmission can be split into five groups of 10 ms each and can be transmitted using 5 different burst cycles over a total duration of $5*T_{burst}=500$ ms (e.g., 10 ms data during $T_{air\_1}$, 90 ms $T_{off\_1}$, 10 ms data during $T_{air\_2}$, 90 ms $T_{off\_2}$, 10 ms data during $T_{air\_3}$, 90 ms $T_{off\_3}$, 10 ms data during $T_{air\_4}$, 90 ms $T_{off\_4}$, 10 ms data during $T_{air\_5}$, 90 ms $T_{off\_5}$).

In a second scenario, the device may have a quantity of packets queued for transmission that is less than the transmission time of $T_{air\_max}=10$ ms that is available for the current burst cycle of $T_{burst}=100$ ms. In this example, the device will still respect the total time of the $T_{burst}=100$ ms, by transmitting the data during a 5 ms $T_{air\_actual}$ followed by a 95 ms $T_{off}$.

In some aspects, within (e.g., during) the off-air times $T_{off}$, the device can be configured to be totally silent in terms of transmitting on the channel or wireless medium to which then duty cycle limit is applicable. For instance, during the off-air time $T_{off}$, the device can be configured to make no transmissions, including acknowledgements (ACKs) of incoming or received messages. In some cases, when using a very small burst (e.g., a single packet), one or more single packet mode duty cycle scheduling algorithms may be used (e.g., described in greater detail below).

Example Single Packet Mode Duty Cycle Scheduling Algorithm 1

The time-on-air of a packet $T_{air}$ is the duration of airtime required for transmitting a Wi-Fi packet. This time-on-air depends on the packet size, bandwidth (BW), and Modulation Coding Scheme (MCS), and can be expressed as a function of BW, MCS, and packet length. In cases when a wireless communication device uses a channel to transmit a frame (or a packet), the limit on duty cycle restricts the wireless communication from transmitting until after a period of silence $T_{off}$, where the off time is given as $$T_{off} = T_{air} \cdot (\frac{1}{D} - 1).$$

D is the duty cycle which is typically in the range of 0.01% to 10%.

For example, an AP having a duty cycle constraint of 10% will transmit a beacon with a time-on air of $T_{air}=3$ ms (and followed by an off-air time of $T_{off}=27$ ms). The off time calculation for the AP to send the beacon is:

$$T_{off} = 3 \text{ ms} \cdot (\frac{1}{10} - 1) = 3 \text{ ms} \cdot (10 - 1) = 27 \text{ ms}.$$

The AP thus needs to be silent (e.g., off-air) for 27 ms after the 3 ms spent transmitting the beacon.

Below is an example pseudo-code corresponding to an implementation of the example Single Packet Mode Duty Cycle Scheduling Algorithm 1:

```
1    Loop:
2      if packet_ready
3        T_air = send_packet_duration( )
4        send_packet( )
5        T_off = T_air * (1/D – 1)
6        sleep T_off
7    Goto Loop
```

Example Single Packet Mode Duty Cycle Scheduling Algorithm 2

Figure 5:
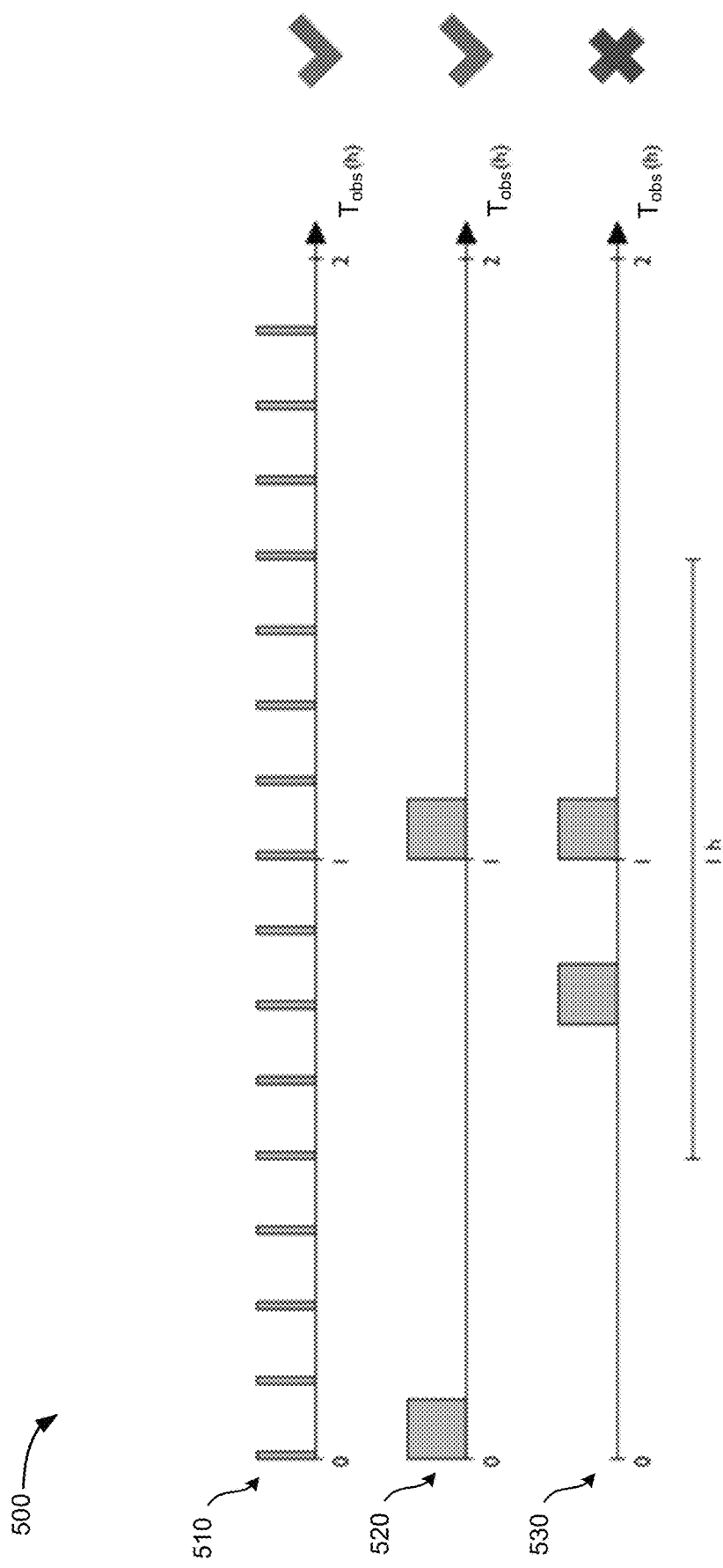
FIG. 5 is a diagram illustrating an example of different duty cycle scheduling or transmission patterns relative to two consecutive observation periods ($T_{obs}$), in accordance with some examples.

FIG. 5 is a diagram illustrating an example of different duty cycle scheduling or transmission patterns relative to two consecutive observation periods ($T_{obs}$), in accordance with some examples. The duty cycle does not have any restrictions on how the transmissions should be spread out in time. For instance, the duty cycle calculation makes no distinction if the transmission times (e.g., $T_{air}$) are evenly spaced out as shown in the example 510 of FIG. 5, or if the transmission time $T_{air}$ is used up at the beginning of the observation period $T_{obs}$ and the rest of the observation period waited out as shown in the example 520 of FIG. 5. The only thing that must be respected is the maximum duty cycle ratio itself. For example, devices are allowed to transmit using bursty traffic, e.g., transmitting 36 seconds (s) and then waiting for 3,564 s for a duty cycle of 1%. However, as the start of the observation period $T_{obs}$ is not exactly defined, one must be cautious that such burst traffic do not occur in the same observation period $T_{obs}$ as shown in example 530 of FIG. 5.

In particular, FIG. 5 depicts three examples (e.g., 510, 520, 530) of how transmissions can be spread in time during the observation period $T_{obs}$. The first example 510 illustrates an example of evenly distributed spreading, in which a plurality of equal on-air transmission intervals $T_{air}$ are evenly spaced using a separation of $T_{off}$ between adjacent instances of $T_{air}$. The second example 520 illustrates an example of using all available transmission time $T_{air}$ in a single burst. In other words, the cumulative or total transmission time $T_{air\_cum}$ is equal in examples 510 and 520. In the third example 530, although it is also an example of using all available transmission time $T_{air}$ in a single burst per observation period $T_{ons}$, due to the offset in the first burst away from the beginning of the first observation period $T_{obs}$ (e.g., the left burst begins after the start of the left-most observation period $T_{obs}$), there are there actually two bursts in a single alternate construction of the observation period $T_{obs}$ (where the alternate construction of the observation period $T_{obs}$ is a valid observation period, recalling that the start of the observation period may be randomly selected). The device in example 530 therefore does not conform to the duty cycle regulations.

Figure 6A:
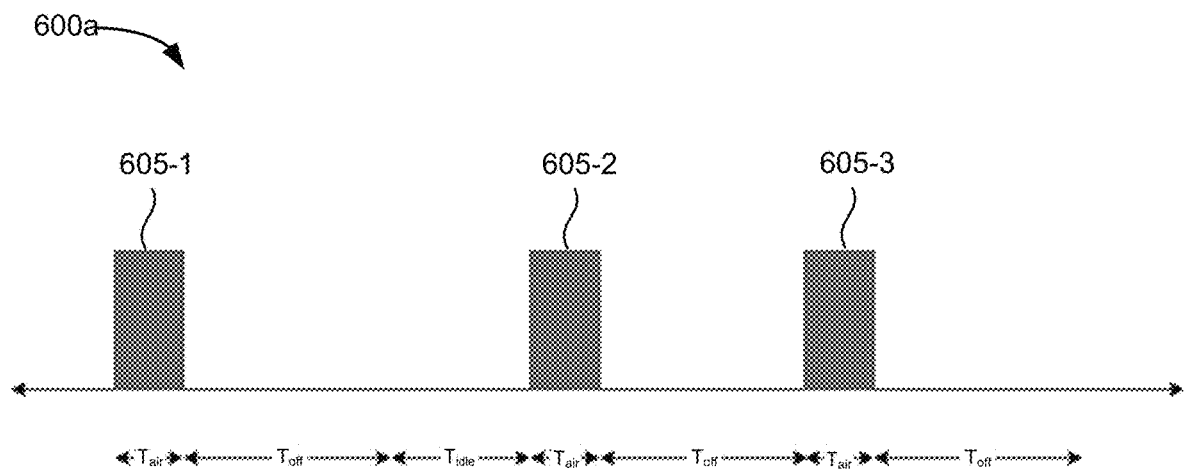
FIG. 6A is a diagram illustrating an example of duty-cycle aware packet transmission performed independent of an idle time between packets, in accordance with some examples.

While the Example Single Packet Mode Duty Cycle Scheduling Algorithm 1 was able to maintain the duty cycle requirement, it is however, not medium optimized and does not consider an idle time that may occur between the expiration of $T_{off}$ of a first burst cycle and $T_{air}$ of a second burst cycle. For instance, FIG. 6A is a diagram illustrating an example of duty-cycle aware packet transmission 600a that is performed independent of an idle time between packets, in accordance with some examples. As illustrated, the $T_{off}$ calculation for sending a second packet 605-2 does not consider an idle time $T_{idle}$ that occurs after sending a first packet 605-1 (and more particularly, after the $T_{off}$ associated with sending the first packet 605-1) and before sending the second packet 605-2. With the addition of the $T_{idle}$ time between the first and second packets 605-1 and 605-2, respectively, the duty cycle limit could still be met if the third packet 605-3 were to be transmitted closer in time to the second packet 605-2 by an interval less than or equal to the $T_{idle}$ time. Instead, in the approach of example packet transmission 600a, the device will wait for the full off-air time $T_{off}$ after sending the second packet 605-2 before sending the third packet 605-3. The idle time $T_{idle}$ is the time where the device is not transmitting, that is there are no packets to send or a different device is transmitting.

In one illustrative example, the Single Packet Mode Duty Cycle Scheduling Algorithm 2 can be implemented as a modification of the Single Packet Mode Duty Cycle Scheduling Algorithm 1 described above, in order to consider the idle time $T_{idle}$ when calculating the off-air time $T_{off}$:

$$T_{off} = T_{air} \cdot \left(\frac{1}{D} - 1\right) - T_{idle} \quad \text{Eq. (5)}$$

Figure 6B:
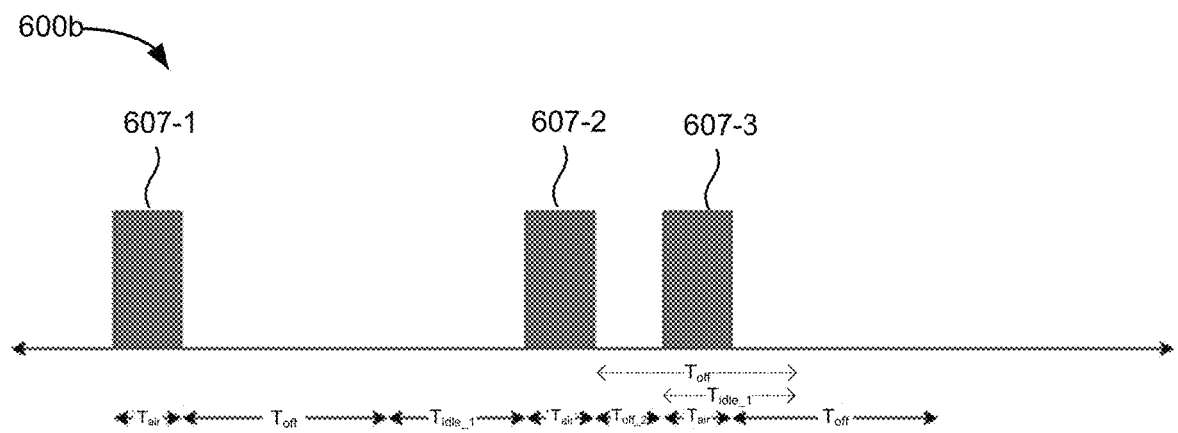
FIG. 6B is a diagram illustrating an example of duty-cycle aware packet transmission performed based at least in part on an idle time between packets, in accordance with some examples.

FIG. 6B is a diagram illustrating an example of duty-cycle aware packet transmission 600b performed based at least in part on the idle time $T_{idle}$ between packets, in accordance with some examples. For instance, as illustrated in FIG. 6B, after transmission of a first packet 607-1, the device rests for a time interval equal to $T_{off}+T_{idle\_1}$ before transmitting a second packet 607-2. Accordingly, in one illustrative example, the Single Packet Mode Duty Cycle Scheduling Algorithm and/or Eq. (5) can be used to reduce the off-air time $T_{off\_2}$ time between the second packet 607-2 and the third packet 607-3. In particular, $T_{off\_2}$ can be reduced by subtracting the idle time $T_{idle\_1}$ from the full off-air time $T_{off}$, such that $T_{off\_2}=T_{off}-T_{idle\_1}$. Note that the full off-air time $T_{off}$ is equal to one over the duty cycle percentage minus 1 (e.g., 1/D−1) multiplied by the time-on-air $T_{air}$.

In some embodiments, the idle time $T_{idle}$ can be cleared or otherwise reset after a pre-determined number of packet transmissions. For example, the predetermined number of packet transmissions for clearing $T_{idle}$ can be equal to one, in which case the device clears the idle time $T_{idle}$ after each packet transmission. As shown in FIG. 6B, even if the idle time $T_{idle}$ between the first packet 607-1 and the second packet 607-2 is long enough for the device to transmit three additional packets, the off-air time $T_{off}$ required after transmitting the third packet 607-3 will be set equal to the full off-air time $T_{off}$. By doing so, the device will not send three consecutive packets regardless of the length of the idle time $T_{idle}$. This is to avoid the above note regarding the nondeterministic observation period. An exemplary pseudo-code that for an example implementation of Single Packet Mode Duty Cycle Scheduling Algorithm 2 is shown below.

| | |
|---|---|
| 1 | Tidle_start = time. |
| 2 | Loop: |
| 3 | if packet_ready( ) |
| 4 | $T_{idle}$ = time − $T_{idle\_start}$ |
| 5 | $T_{air}$ = send_packet_duration( ) |
| 6 | send_packet( ) |
| 7 | $T_{off}$ = $T_{air}$ * (1/D − 1) − $T_{idle}$ |
| 8 | sleep $T_{off}$ |
| 9 | $T_{idle\_start}$ = time |
| 10 | Goto Loop |

Example Single Packet Mode Duty Cycle Scheduling Algorithm 2 has a risk of one extra transmission if the observation period $T_{obs}$ does not consider the idle time $T_{idle}$ ahead of the packet. However, this is an extremely minimal risk because the observation period $T_{obs}$ is usually very long, for example, 1 hour, compared to just a few milliseconds for transmission (e.g., $T_{air}$). Additionally, it is noted that an extra idle period during the observation period $T_{obs}$ can account for this extra packet transmission.

Example Single Packet Mode Duty Cycle Scheduling Algorithm 3

To reduce the impact on overall system performance, the duty cycle scheduling algorithm in one embodiment is modified to allow for early transmission of Null Data Packet (NDP), Beacon, and ACK packets. When a packet is transmitted early, the packet is transmitted prior to the expiration of the corresponding off-air $T_{off}$ timer. In one illustrative example, the remainder of the $T_{off}$ timer duration is stored and added to the off-air time $T_{off}$ of the next packet to be transmitted, using a $T_{early}$ term as shown:

$$T_{off} = T_{air} \cdot \left(\frac{1}{D} - 1\right) + T_{early} \qquad \text{Eq. (6)}$$

$T_{early}$ is reset to zero every time it is used to increase the off-air time $T_{off}$ period. In this embodiment, it is possible that the duty cycle restrictions are not guaranteed across an arbitrary observation window $T_{obs}$. However, it is anticipated that in practice this small discrepancy (a few 10 s of ms at most) is negligible compared to the 360 second transmission budget in a 60 minute observation window. It is also expected that this scenario in practice only occur when an AP is transmitting large quantities of ACKs in response to short transmissions from multiple STAs, each of which are subject to their own 2.8% duty cycle restriction for STAs.

Transmitting and Receiving Restrictions Considering Acknowledgement (ACK) Packets Acknowledgement (ACK) packets can be seen as part of the transmitting device duty cycle. According to some embodiments, the off-air time for an ACK packet can calculated based on treating the ACK packet as a separate transmission having an on-air or transmission time of $T_{air}$=240 microseconds (us). In the following example, the duty cycle constraint for the device is 2.7%:

$T_{off}$=0.24*(1/2.7%−1)~9 ms.

As indicated above, any device after sending an ACK packet needs around 9 ms to recover to be able to send more data. To guarantee the transmission of ACK packets, any device should not receive packets more frequently than 9 ms. In a single communication between an AP and an STA, this is usually not a problem as the transmitting device needs to wait an additional amount of time (e.g., $T_{off}$) before sending another packet. However, a problem may occur when multiple STAs are sending data to an AP with the transmissions from multiple STAs less than 9 ms apart. In such cases, the AP will not transmit the corresponding ACKs in time (e.g., based on the need for the AP with a duty cycle constraint of 2.7% to wait at least 9 ms between sending each ACK), and the ACKs will accumulate and be queued for later re-transmission.

In Japan, response frames such as ACKs and Clear To Send (CTS) are not counted in the duty cycle. In some embodiments, the response time of transmission responses to requests by other radio equipment is not included in the sum of transmission time per arbitrary one hour of observation window.

In some embodiments, fragmented transmission is handled by tracking the total transmission time for the fragments, and using this total transmission time as the basis for calculating the off time $T_{off}$. This could be expanded upon by reducing $T_{off}$ by the ACK receiving gaps.

Single Packet Burst

Figure 7:
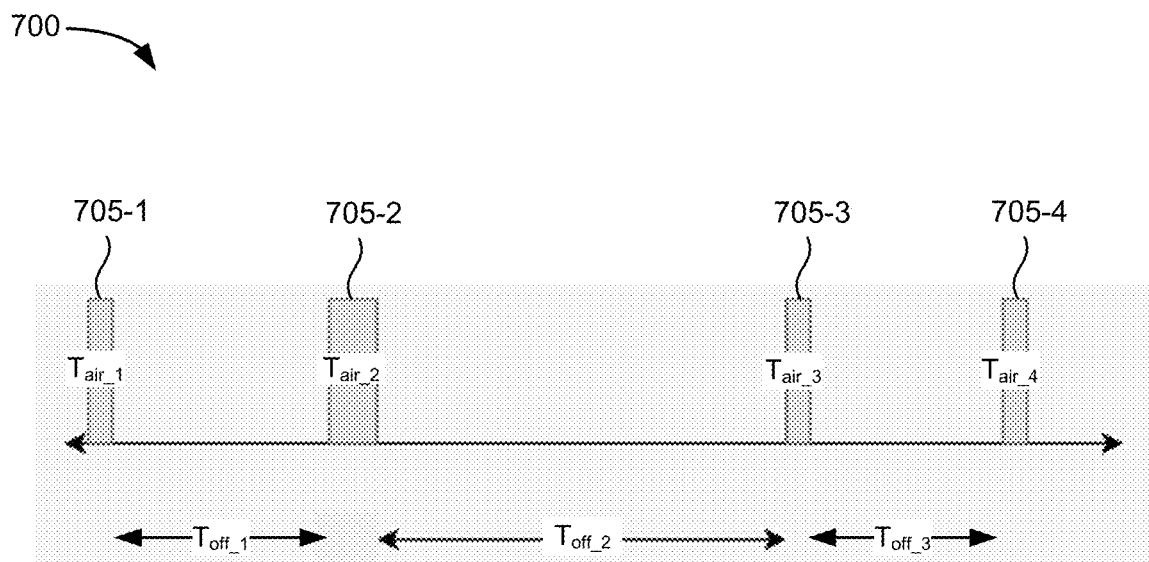
FIG. 7 is a diagram illustrating an example of duty cycle-aware packet transmission using a burst period equal to a single packet duration, in accordance with some examples.

As mentioned previously, in some examples the burst mode duty cycle scheduling can be used to implement a single packet burst with a burst size of one packet. This single packet burst mode can be considered a special case of the burst mode duty cycle scheduling algorithm described above, with the burst period (e.g., burst cycle time $T_{burst}$ being the same as or similar to a single packet duration). FIG. 7 is a diagram illustrating an example of duty cycle-aware packet transmission using a burst period $T_{burst}$ equal to a single packet duration, in accordance with some examples.

In this example, the length of packet transmission associated with the burst cycles may vary between burst cycles. For instance, the $T_{air\_1}$ associated with packet transmission 705-1 of a first burst cycle is different from (e.g., shorter than) the $T_{air\_2}$ associated with packet transmission 705-2 of a second burst cycle, which is itself different from the $T_{air\_3}$ and $T_{air\_4}$ associated with packet transmission 705-3 and 705-4 of third and fourth burst cycles, respectively.

In some aspects, the packet transmission 705-2 can be longer than the packet transmissions 705-1, 705-3, 705-4 based on packet transmission 705-2 including a greater quantity of packets. For instance, the second packet transmission 705-2 may be a burst transmission that includes a plurality of packets, while the packet transmissions 705-1, 705-3, 705-4 may be single packet transmissions (and/or may be burst transmissions that include a smaller number of packets than 705-2). In other examples, each of the packet transmissions 705-1-705-4 may be single packet transmissions, with the $T_{air\_2}$ being longer than. The $T_{air\_1}$, $T_{air\_3}$, and $T_{air\_4}$ based on the packet transmission 705-2 being a single packet having a longer transmission time than the corresponding single packet transmission time(s) associated with the packet transmissions 705-1, 705-3, 705-4.

In the example of FIG. 7, each packet 705-1, 705-2, 705-3, 705-4 can be transmitted and followed by a corresponding off-air time $T_{off}$. The off-air time $T_{off}$ can be calculated to be sufficiently long enough to meet duty cycle requirements (e.g., using one or more of the equations for $T_{off}$ presented above). This guarantees the shortest possible silent time for the device (e.g., the $T_{off}$ time). The burst duration $T_{burst}$ can be varying based on the transmitted packet size for each packet and/or for each burst cycle.

Figure 8:
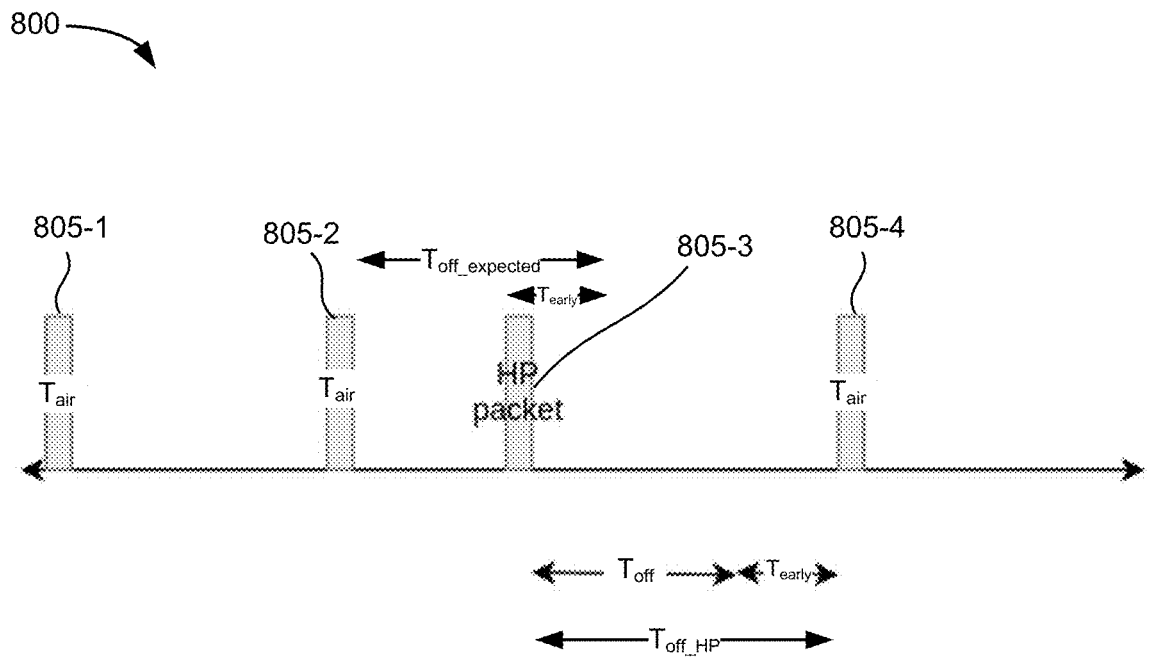
FIG. 8 is a diagram illustrating an example of duty cycle-aware packet transmission including a high-priority packet that is transmitted without delay, in accordance with some examples.

FIG. 8 is a diagram illustrating an example of duty cycle-aware packet transmission 800 including a high-priority packet that is transmitted without delay, in accordance with some examples. In some embodiments, the duty cycle-aware packet transmission 800 can be used to implement early transmission of one or more packets before the expiration of the off-air time $T_{off}$ of the immediately subsequent packet. In some aspects, early transmission is performed for one or more high-priority packets. For instance, a high-priority packet can be a packet that needs to be sent at an exact time in order to avoid breaking functionality of the WLAN and/or the connection(s) between the AP(s) and/or STA(s) corresponding to or otherwise associated with the high-priority packet. In some examples, high-priority packets can include beacons, ACKs, and probe responses, as delaying the transmissions of these packets until the next burst may affect the functionality and/or performance of the system.

In the example of FIG. 8, packets 805-1, 805-2, and 805-4 are normal priority packets (e.g., non-high-priority packets) and packet 805-3 is a high-priority (HP) packet. As illustrated, the next packet after second packet 805-2 would not normally be eligible for transmission until the expiration of the off-air period calculated for second packet 805-2, e.g., shown in FIG. 8 as $T_{off\_expected}$.

Because HP packet 805-3 is a high-priority packet, HP packet 805-3 can be transmitted prior to the expiration of $T_{off\_expected}$ for the second packet 805-2. In one illustrative example, a remaining time (e.g., time difference) can be calculated between the early time at which HP packet 805-3 is transmitted and the $T_{off\_expected}$ time of the immediately prior packet transmission (e.g., second packet 805-2). This remaining time can be referred to as $T_{early}$, e.g., indicative of the time interval by which the HP packet 805-3 was transmitted early relative to its otherwise expected transmission time at $T_{off\_expected}$.

After early transmission of HP packet 805-3, the calculated remaining off-air time $T_{early}$ is added to the normally calculated off-air time for the HP packet 805-3 (e.g., the off-air time $T_{off}$ that would be used if HP packet 805-3 were not transmitted early). Accordingly, the time difference from transmitting HP packet 805-3 early by the $T_{early}$ time value can be recovered by implementing an extended off-air duration following the HP packet 805-3, given as $T_{off\_HP} = T_{off} + T_{early}$.

Duty cycle restrictions may not be met during the observation period $T_{obs}$, depending on the choice of the beginning time for $T_{obs}$ and/or based on the number of high-priority packets that are sent early during the selected $T_{obs}$. However, the duration of a high-priority packet such as HP packet 805-3 can be seen to be order of magnitude smaller than the observation period $T_{obs}$, in which case it is highly unlikely for there to be any significant overall influence on duty cycle limit adherence.

Example Implementation of Duty Cycle Scheduling

Figure 9:
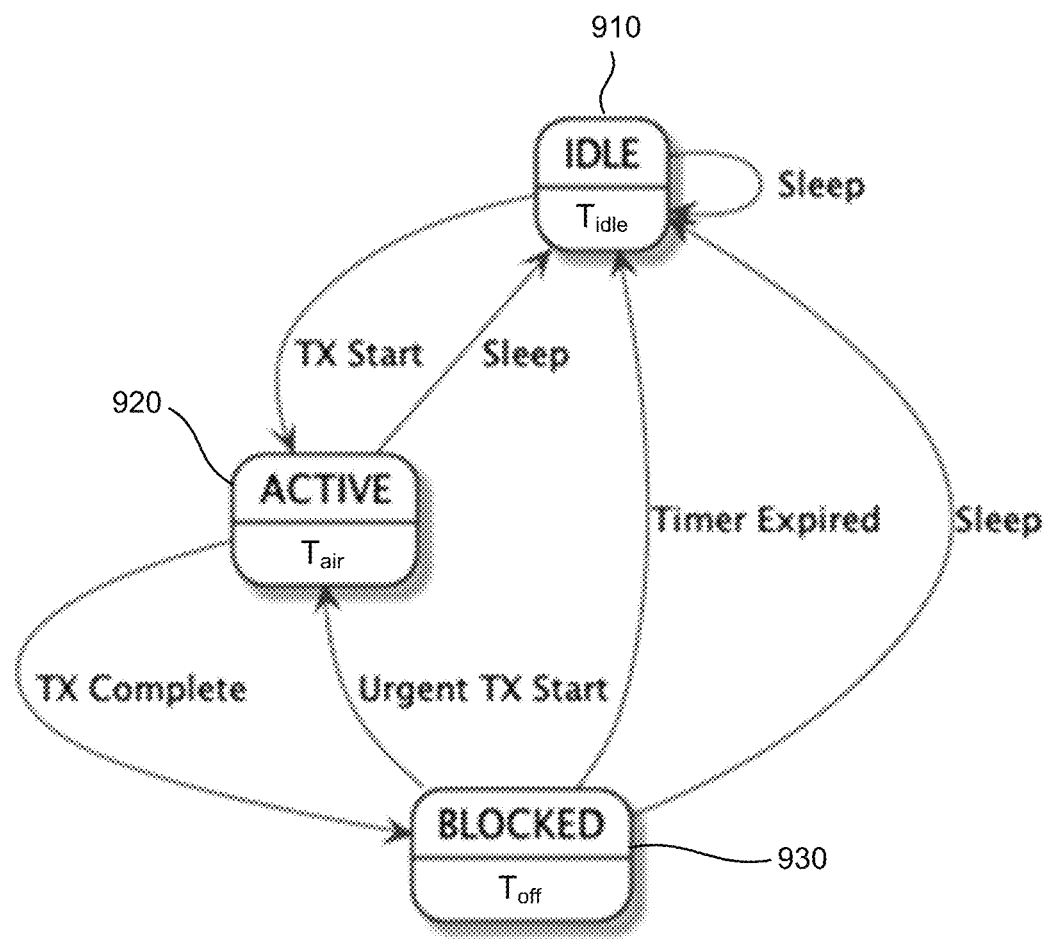
FIG. 9 is a state diagram showing example state transitions by a finite state machine used to implement aspects of the presently disclosed duty cycle management, in accordance with some examples.

FIG. 9 is an example state diagram 900 showing example state transitions by a finite state machine used to implement aspects of the presently disclosed duty cycle scheduling and/or management, in accordance with some examples. As illustrated, the duty cycle implementation by a finite state machine 900 has three states. An IDLE state 910 can correspond to the $T_{idle}$ duration described above, wherein a device may enter a low-power mode and/or otherwise is able to transmit without violating duty cycle requirements but currently has no packets queued for transmission. An ACTIVE state 920 can correspond to the $T_{air}$ duration described above, wherein a device is actively transmitting packets on the wireless medium. A BLOCKED state 930 can correspond to the $T_{off}$ durations variously described above, wherein a device is prevented from transmitting packets on the wireless medium in order to adhere to duty cycle limits or requirements.

In some aspects, a normal sequence of transitions between states is IDLE→ACTIVE→BLOCKED→IDLE (e.g., $T_{idle} \rightarrow T_{air} \rightarrow T_{off} \rightarrow T_{idle}$). Examples of the state transitions and their corresponding trigger events are described below.

From the IDLE state 910 (e.g., $T_{idle}$), a device may remain in IDLE state 910 via the state transition 'Sleep.' Alternatively, or additionally, a device may transition from IDLE state 910 to ACTIVE state 920 (e.g., $T_{idle} \rightarrow T_{air}$) via the state transition 'Tx Start,' corresponding to the device beginning transmission of one or more packets at a scheduled on-air time $T_{air}$ determined based on duty cycle scheduling requirements.

From the ACTIVE state 920 (e.g., $T_{air}$), a device may return to the IDLE state 910 via state transition 'Sleep,' if the device completes transmission of one or more packets during $T_{air}$ and has no further packets to transmit. From the ACTIVE state 920 (e.g., $T_{air}$), a device may transition to the BLOCKED state 930 (e.g., $T_{off}$) via state transition 'Tx Complete,' corresponding to the completion of packet transmission during $T_{air}$.

From the BLOCKED state 930 (e.g., $T_{off}$), a device may return early to the ACTIVE state 920 (e.g., $T_{air}$) for the early transmission of a high-priority packet (e.g., beacon, ACK, probe response) via the state transition 'Urgent Tx Start.' The device may transition to IDLE state 910 (e.g., $T_{idle}$) if the off-air duration $T_{off}$ expires and another packet is queued or available for transmission (in which case the device immediately transitions from IDLE state 910 to ACTIVE state 920). If another packet is not queued or available for transmission at the expiration of the off-air duration $T_{off}$, the device can transition from BLOCKED state 930 to IDLE state 910 via the state transition 'Sleep.'

In one embodiment, all states are reset when the device enters the sleep mode, and the timer is stopped. This is because the current time is not maintained in the sleep state, and time restarts on waking from the sleep state.

Example Respect Algorithm

A respect algorithm can be used to classify packets based on two criteria. The first criteria can be indicative of or otherwise associated with stallable packets versus real time packets. A stallable packet is a packet that can be delayed (e.g., the packet is stallable). Delaying a stallable packet may result in a degraded performance, but will not cause an error in Wi-Fi operation. An unstallable, or real-time packet, is a packet that will break the Wi-Fi operation if it is delayed. Examples of real-time (e.g., unstallable) packets can include, but are not limited to, ACK packets, Beacons, probe responses, etc. In some aspects, the high-priority packets described previously above may be examples of real-time/unstallable packets. ACK packets can be considered real-time/unstallable packets based on the fact that delaying the transmission of an ACK packet can cause a device (e.g., the device receiving the ACK) to determine that the packet corresponding to the ACK was not delivered successfully.

Similarly, Beacons can be considered real-time/unstallable packets because Beacons should always be delivered in time The second criteria for implementing the respect algorithm can be indicative of associated packets versus un-associated packets. Associated packets are packets sent to associated STAs, while un-associated packets are sent to any STA not associated with the Service Set Identifier (SSID). Some examples of un-associated packets are probe response, association response, hand shaking messages, etc.

In one illustrative example, the respect algorithm can be implemented to assign a first priority (e.g., first priority value) to associated real-time packets, such as ACKs and Beacons within the SSID. A second, lower priority (e.g., second priority value) can be assigned to un-associated real time packets, such as probe responses, association response, and hand shaking messages.

In some embodiments, the term "essential packet(s)" can be used to refer collectively to both the associated real-time packets and the un-associated real-time packets. In some aspects, the term "essential packet(s)" can refer to one of the two types of real-time packets (e.g., either associated or un-associated), depending on context. Non-essential packets include any packet that is not real-time (e.g., packets not included in the "essential" packet classification). These non-essential packets are usually stallable associated packets, such as data or management packets sent to associated nodes, although it is noted that non-essential packets can also include stallable un-associated packets.

In some embodiments, the term transmission credit (Tx credit) can be used to refer to the amount of time a node still has to transmit in the medium without saturating its duty cycle. For instance, if $T_{air\_max}$ is the maximum on-air time a node can transmit for before saturating its duty cycle for a given observation window $T_{obs}$, the transmission credit of the node can be determined as the difference between $T_{air\_max}$ and $T_{air\_cum}$, where $T_{air\_cum}$ is the cumulative on-air time used by the node at the current time (e.g., transmission credit=$T_{air\_max}-T_{air\_cum}$). A full Tx credit indicates the full on-air time $T_{air\_max}$ is available and can be used to access the medium. A reserved Tx credit is the Tx credit reserved or set aside for the transmission of essential packets (e.g., real-time and un-associated packets). The reserved Tx credit can be split into a real-time credit and an un-associated credit in some embodiments. A non-essential Tx credit is calculated by subtracting the reserved Tx credit from the full Tx credit.

While each STA is aware of its own Tx credit, it does not know much about the Tx credit of the receiving side (either another STA or an AP). To avoid starving the receiving entity and consequently not receiving ACKs from the receiving entity, a sending STA follows a conservative transmission sending policy according to an embodiment of respecting the receiver's reserved Tx credit. The conservative transmission sending policy can be implemented based on the STA (e.g., transmitter) sending sparse packets at a rate sufficient to allow the receiving side to regain enough Tx credit to refill its reserved credit.

For example, an AP can send packets to a STA with a 2.8% duty cycle, by spreading its packets to be 10 ms apart (end to end), thereby allowing the receiving STA to accumulate enough credit to transmit a 250 us ACK. The AP can transmit to other STAs in between if the AP has enough Tx credit and is able to transmit while respecting the reserved credit of the other STAs. As the receiving side will always have sufficient reserved credit for the transmission of its real-time packets, the respect algorithm guarantees that 10 ms sparse packets are always ACKed from the receiving side. On the other hand, a transmitting STA sending packets to an AP can implement the respect algorithm by waiting only 2.5 ms between packets, as the APs have a 10% duty cycle.

A more complicated example is an un-associated probe request/response transaction, in which a STA issuing a probe request to an AP receives two kinds of packets, a real time packet (i.e. ACK for the probe request) and an un-associated probe response. The STA should allow enough time to pass for the AP to restore its consumed reserved credit (ACK+ probe request) before issuing the next packet. For example, an AP consumes around 250 us for an ACK and around 1.2 ms to send a probe response, as a result, the station should hold off initially for 2.5 ms for the ACK and then 12 ms for the probe response.

With respect to the discussion above regarding calculated wait times, it is noted that such wait times may actually be measured at the end of the packet transmission (e.g., when the AP is supposed to send another ACK). Accordingly, a packet that takes around 1.2 ms on the medium can start sending 1.2 ms earlier than the Tx credit time would indicate (e.g. by starting transmission of the packet at 1.3 ms after the last packet in the above example, as 2.5 ms−1.2 ms=1.3 ms). With bigger packets that consume more than 2.5 ms, back-to-back packets can be sent given enough credit.

In some embodiments, only the real-time credit may be respected. A node continuously updates its available Tx credit when transmitting packets. A minimum reserved credit is always held for the real-time (and un-associated) packets. As long as there is a Tx credit, a node keeps sending non-essential packets. Once the Tx credit reaches the reserved credit threshold, only essential packets are allowed to be sent until the node accumulates more credit to send non-essential packets. STAs only have ACKs as real-time packets, and since the STAs are receiving only from the AP, the real-time credit of only one ACK is required as the reserved credit for each STA. However, an AP is more complicated, as the real-time packets include ACKs for every associated STA, in addition to Beacons. An AP can limit its reserved credit within a Beacon period to include only real-time credit, in a manner the same as or similar to that detailed above. This guarantees that there are no packets lost in the SSID due to lack of Tx credit.

Respecting only the real-time credit can cause the AP to be unable to respond to un-associated messages if the AP is running out of credit. For example, the AP will not respond to a probe request from an outer STA when the AP lacks Tx credit. This may result in failing scans or associations. In another embodiment of respecting own's reserved credit, un-associated credit is also respected. The AP increases its reserved credit to account for one or more (or several) un-associated packets. This would allow an AP to respond to two extra operations (e.g. scan and association request) happening in parallel (along with other nodes) without running out of credit. An AP may run out of un-associated credit due to too frequent probe requests or associations from multiple STAs. In one embodiment, an AP will not consume its real-time credit for un-associated packets, and will hold off until more credit is regained. Credit goes to fill the real time credit, followed by the un-associated credit, and finally the stallable or data credit. Scanning or associating STAs issuing un-associated packets should also adhere to respecting the receiving entity Tx credit constraints as detailed above.

Figure 10:
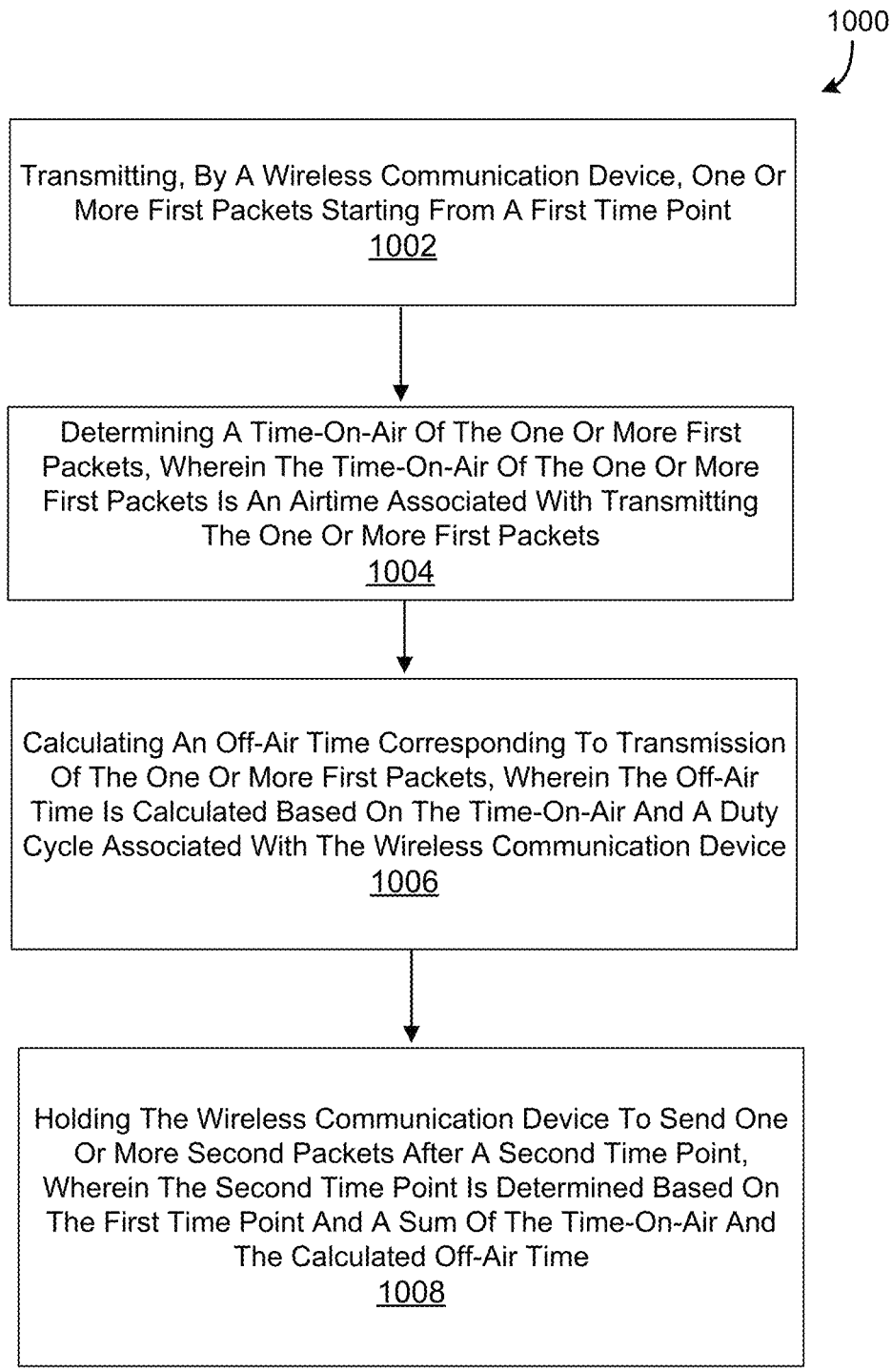
FIG. 10 is a flow diagram of a method of wireless transmission over a WLAN, in accordance with some examples.

FIG. 10 is a flow diagram of an example of a process 1000 for wireless transmission over a Wireless Local Area Network (WLAN), in accordance with some examples. In some examples, the process 1000 can be performed by a wireless communication device, such as a Wi-Fi station (STA) and/or a Wi-Fi access point (AP).

At block 1002, the process 1000 includes transmitting, by a wireless communication device, one or more first packets starting from a first time point. For instance, the one or more first packets can comprise one or more acknowledgement (ACK) packets. In some cases, the wireless communication device can wait for at least a calculated off-air time associated with transmitting the one or more ACK packets following each transmission of an ACK packet by the wireless communication device. In some examples, the one or more first packets can include one or more of an ACK packet, a beacon, a probe, a data packet, etc.

At block 1004, the process 1000 includes determining a time-on-air of the one or more first packets, wherein the time-on-air of the one or more first packets is an airtime associated with transmitting the one or more first packets. For instance, the time-on-air of the one or more first packets can be the same as or similar to the $T_{air}$ described above, and may be indicative of an amount of time used or required by the wireless communication device for transmitting the one or more first packets. In some cases, the time-on-air for transmitting the one or more first packets is restricted to be within a maximum time-on-air, such that the time-on-air for transmitting the one or more first packets is less than or equal to the maximum time-on-air. For instance, $T_{air}$ can be less than or equal to a maximum time-on-air that is the same as or similar to the $T_{air\_max}$ described previously above.

In some cases, the maximum time-on-air (e.g., the same as or similar to the $T_{air\_max}$ described previously above) can be determined based on a burst cycle duration and the duty cycle associated with the wireless communication device. For instance, the burst cycle duration can be the same as or similar to $T_{burst}$ and the duty cycle associated with the wireless communication device can be the same as or similar to the duty cycle D. In some examples, the duty cycle can be 2.8% for STAs and 10% for APs.

In some examples, one or more of the burst cycle duration or the maximum time-on-air (or both) is determined and configured by an application running on the wireless communication device.

In some aspects, an off-air time corresponding to transmission of the one or more first packets (e.g., the same as or similar to the $T_{off}$ described previously above) is calculated based at least in part on subtracting the time-one-air (e.g., $T_{air}$) for transmitting the first packets from the burst cycle duration (e.g., $T_{burst}$).

In some cases, the duty cycle (e.g., D) associated with the wireless communication device can correspond to a duty cycle observation window. The duty cycle observation window can be the same as or similar to the duty cycle observation window/monitor time $T_{obs}$ described previously above. In some aspects, a duration of the duty cycle observation window (e.g., $T_{obs}$) comprises an integer multiple (e.g., n) of the burst cycle duration (e.g., $T_{burst}$). For instance, in some cases $T_{obs} = n \ast T_{burst}$.

In some examples, the one or more first packets and one or more second packets are included in a data transmission requiring an airtime greater than the maximum time-on-air (e.g., greater than $TT_{air\_max}$). In such examples, the data transmission can be split into at least a first subset comprising the one or more first packets and a second subset comprising the one or more second packets. Both transmitting the first subset and transmitting the second subset requires an airtime less than or equal to the maximum time-on-air (e.g., $T_{air\_subset\_1} \leq T_{air\_max}$ and $T_{air\_subset\_2} \leq T_{air\_max}$).

At block 1006, the process 1000 includes calculating an off-air time corresponding to transmission of the one or more first packets, wherein the off-air time is calculated based on the time-on-air and a duty cycle associated with the wireless communication device. For instance, the off-air time can be the same as or similar to the off-air time $T_{off}$ described previously above. In one illustrative example, the off-air time can be calculated based on the time-on-air (e.g., $T_{air}$) and the duty cycle D. For instance, the off-air time can be calculated according to any of Eqs. (1), (2), (4), (5), and/or (6), described previously above.

In some examples, the off-air time corresponding to transmission of the one or more first packets is calculated based on $T_{off} = T_{air} \ast (1/D - 1)$, wherein $T_{off}$ is the off-air time, $T_{air}$ is the time-on-air required to send the one or more first packets, and D is the duty cycle associated with the wireless communication device.

In some examples, the one or more first packets comprises one of a Null Data Packet (NDP), a Beacon, or an ACK packet. In some examples, the wireless communication device can perform early transmission of the one or more first packets by a time amount equal to the early time duration. For instance, the wireless communication device can perform early transmission of one or more high-priority packets by a time amount equal to an early time duration $T_{early}$. In some examples, the off-air time associated with transmission of the one or more first packets is extended by the time amount equal to the early time duration (e.g., $T_{early} + T_{off}$).

At block 1008, the process 1000 includes holding the wireless communication device to send one or more second packets after a second time point, wherein the second time point is determined based on the first time point and a sum of the time-on-air and the calculated off-air time. For instance, the first time point can correspond to the beginning of a first burst cycle and the second time point can correspond to the beginning of a second burst cycle. In some examples, the second time point can be determined based on the first time point and the sum of $T_{air}$ and $T_{off}$ corresponding to the previous burst cycle.

In some aspects, the wireless communication device is silent during the off-air time, such that the wireless communication device does not perform any packet transmissions during the off-air time.

In some cases, the process 1000 further includes transmitting, by the wireless communication device, the one or more second packets starting from a third time point greater than or equal to the second time point. For instance, the second time point can be the end of the $T_{off}$ interval of a first burst cycle. The third time point can be the start of the $T_{air}$ interval of a second burst cycle subsequent to the first burst cycle. In some embodiments, the time between the second time point and the third time point can be an idle time the same as or similar to the idle time $T_{idle}$ described previously above. The process 1000 can further includes determining an idle time based on a difference between the second time point and the third time point and determining a time-on-air of the one or more second packets, wherein the time-on-air of the one or more second packets is an airtime associated with transmitting the one or more second packets. The process 1000 can further include calculating off-air time corresponding to transmission of the one or more second packets, based on the time-on-air of the one or more second packets, the duty cycle associated with the wireless communication device, and the idle time. The process 1000 can further include holding the wireless communication device to send one or more third packets after a fourth time point, wherein the fourth time point is determined based on the third time point and a sum of the time-on-air and the calculated off-air time of the one or more second packets. In some cases, the off-air time corresponding to transmission of the one or more second packets is calculated based on $T_{off}=T_{air}*(1/D-1)-T_{idle}$, wherein $T_{off}$ is the off-air time of the one or more second packets, $T_{air}$ is the time-on-air of the one or more second packets, D is the duty cycle associated with the wireless communication device, and $T_{idle}$ is the idle time. In some aspects, a value of the idle time is reset after transmitting the one or more third packets.

Although the invention is illustrated and described herein with reference to specific embodiments, the invention is not intended to be limited to the details shown. Rather, various modifications may be made in the details within the scope and range of equivalents of the claims and without departing from the invention.

It is to be understood that the above description is illustrative of the invention and is not to be construed as limiting the invention. Various modifications, applications and/or combinations of the embodiments may occur to those skilled in the art without departing from the scope of the invention as defined by the claims.

One having ordinary skill in the art will readily understand that the invention as discussed above may be practiced with hardware elements in configurations which are different than those which are disclosed. Therefore, although the invention has been described based upon these preferred embodiments, it would be apparent to those skilled in the art that certain modifications, variations, and alternative constructions would be apparent, while remaining within the scope of the invention.

Throughout this specification, unless the context clearly requires otherwise, the word "comprise", or variations such as "comprises" or "comprising", will be understood to imply the inclusion of a stated element, integer or step, or group of elements, integers, or steps, but not the exclusion of any other element, integer or step, or group of elements, integers, or steps.

Any discussion of documents, acts, materials, devices, articles or the like which has been included in the present specification is solely for the purpose of providing a context for the present technology. It is not to be taken as an admission that any or all these matters form part of the prior art base or were common general knowledge in the field relevant to the present technology as it existed before the priority date of each claim of this specification.

Figure 11:
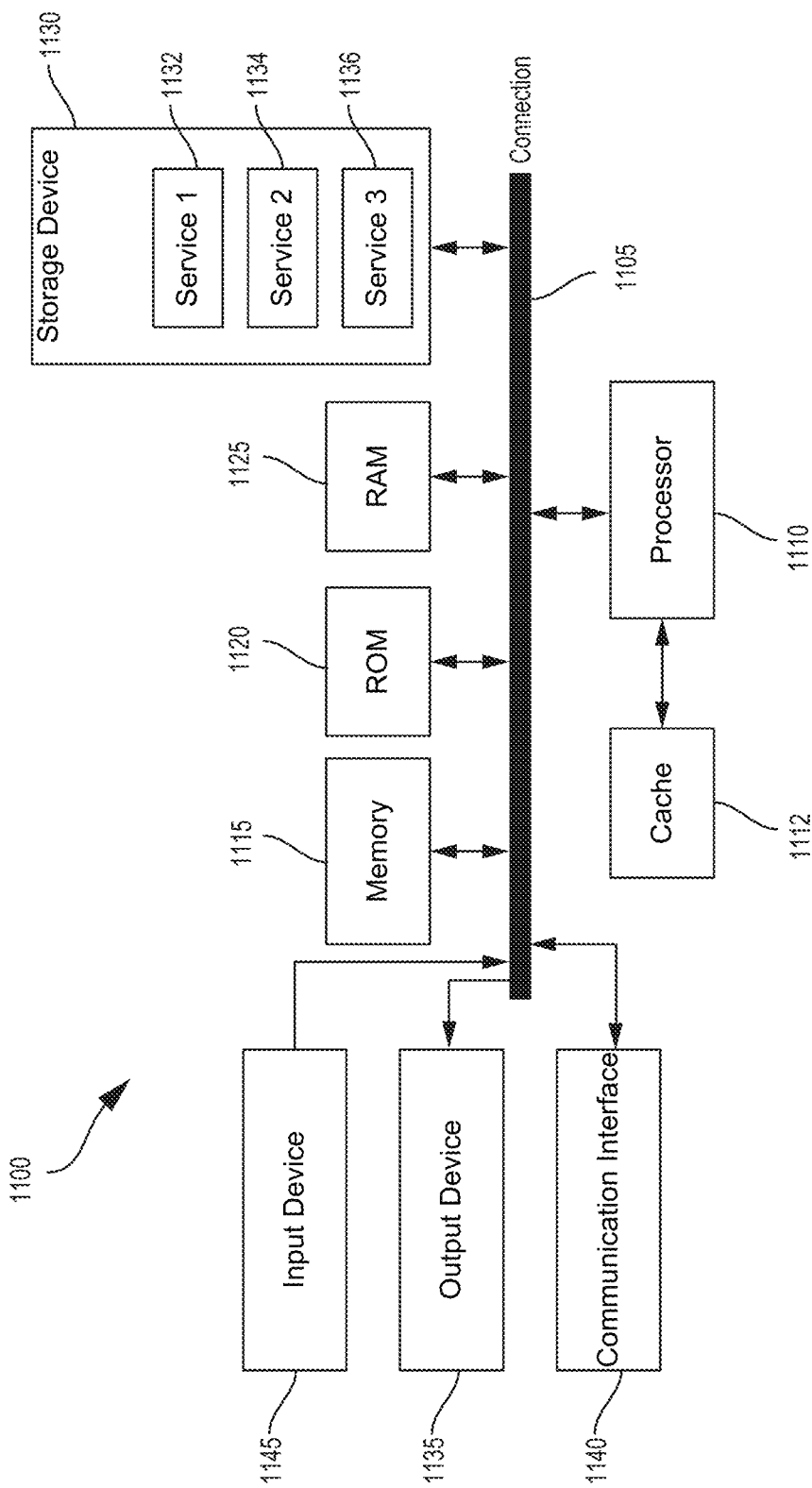
FIG. 11 is a block diagram illustrating an example of a computing system for implementing certain aspects described herein, in accordance with some examples.

FIG. 11 illustrates an example computing device architecture 1100 of an example computing device which can implement the various techniques described herein. In some examples, the computing device can include a mobile device, a wearable device, an extended reality device (e.g., a virtual reality (VR) device, an augmented reality (AR) device, or a mixed reality (MR) device), a personal computer, a laptop computer, a video server, a vehicle (or computing device of a vehicle), or other device. The components of computing device architecture 1100 are shown in electrical communication with each other using connection 1105, such as a bus. The example computing device architecture 1100 includes a processing unit (CPU or processor) 1110 and computing device connection 1105 that couples various computing device components including computing device memory 1115, such as read only memory (ROM) 1120 and random-access memory (RAM) 1125, to processor 1110.

Computing device architecture 1100 can include a cache of high-speed memory connected directly with, in close proximity to, or integrated as part of processor 1110. Computing device architecture 1100 can copy data from memory 1115 and/or the storage device 1130 to cache 1112 for quick access by processor 1110. In this way, the cache can provide a performance boost that avoids processor 1110 delays while waiting for data. These and other engines can control or be configured to control processor 1110 to perform various actions. Other computing device memory 1115 may be available for use as well. Memory 1115 can include multiple different types of memory with different performance characteristics. Processor 1110 can include any general-purpose processor and a hardware or software service, such as service 1 1132, service 2 1134, and service 3 1136 stored in storage device 1130, configured to control processor 1110 as well as a special-purpose processor where software instructions are incorporated into the processor design. Processor 1110 may be a self-contained system, containing multiple cores or processors, a bus, memory controller, cache, etc. A multi-core processor may be symmetric or asymmetric.

To enable user interaction with the computing device architecture 1100, input device 1145 can represent any number of input mechanisms, such as a microphone for speech, a touch-sensitive screen for gesture or graphical input, keyboard, mouse, motion input, speech and so forth. Output device 1135 can also be one or more of a number of output mechanisms known to those of skill in the art, such as a display, projector, television, speaker device, etc. In some instances, multimodal computing devices can enable a user to provide multiple types of input to communicate with computing device architecture 1100. Communication interface 1140 can generally govern and manage the user input and computing device output. There is no restriction on operating on any particular hardware arrangement and therefore the basic features here may easily be substituted for improved hardware or firmware arrangements as they are developed.

Storage device 1130 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1125, read only memory (ROM) 1120, and hybrids thereof. Storage device 1130 can include services 1132, 1134, 1136 for controlling processor 1110. Other hardware or software modules or engines are contemplated. Storage device 1130 can be connected to the computing device connection 1105. In one aspect, a hardware module that performs a particular function can include the software component stored in a computer-readable medium in connection with the necessary hardware components, such as processor 1110, connection 1105, output device 1135, and so forth, to carry out the function.

The term "device" is not limited to one or a specific number of physical objects (such as one smartphone, one controller, one processing system and so on). As used herein, a device may be any electronic device with one or more parts that may implement at least some portions of this disclosure. While the below description and examples use the term "device" to describe various aspects of this disclosure, the term "device" is not limited to a specific configuration, type, or number of objects. Additionally, the term "system" is not limited to multiple components or specific aspects. For example, a system may be implemented on one or more printed circuit boards or other substrates and may have movable or static components. While the below description and examples use the term "system" to describe various aspects of this disclosure, the term "system" is not limited to a specific configuration, type, or number of objects.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as flash memory, memory or memory devices, magnetic or optical disks, flash memory, USB devices provided with non-volatile memory, networked storage devices, compact disk (CD) or digital versatile disk (DVD), any suitable combination thereof, among others. A computer-readable medium may have stored thereon code and/or machine-executable instructions that may represent a procedure, a function, a subprogram, a program, a routine, a subroutine, a module, an engine, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, engines, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, engines, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random-access memory (RAM) such as synchronous dynamic random-access memory (SDRAM), read-only memory (ROM), non-volatile random-access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

What is claimed is:

1. A method of wireless communication over a Wireless Local Area Network (WLAN), the method comprising:
    transmitting, by a wireless communication device, one or more first packets starting from a first time point;
    determining a time-on-air of the one or more first packets, wherein the time-on-air of the one or more first packets is an airtime associated with transmitting the one or more first packets;
    calculating an off-air time corresponding to transmission of the one or more first packets, wherein the off-air time is calculated based on the time-on-air and a duty cycle associated with the wireless communication device;
    holding the wireless communication device to send one or more second packets after a second time point, wherein the second time point is determined based on the first time point and a sum of the time-on-air and the calculated off-air time; and
    continuously updating an available transmission credit associated with the wireless communication device, wherein the wireless communication device is configured to:
        transmit any packet type of a plurality of packet types based on a determination that the available transmission credit is greater than a reserved credit associated with the wireless communication device; and
        transmit only essential packet types of the plurality of packet types based on a determination that the available transmission credit is less than or equal to the reserved credit.

2. The method of claim 1, wherein the off-air time corresponding to transmission of the one or more first packets is calculated based on $T_{off}=T_{air}*(1/D-1)$, wherein $T_{off}$ is the off-air time, $T_{air}$ is the time-on-air required to send the one or more first packets, and D is the duty cycle associated with the wireless communication device.

3. The method of claim 1, further comprising:
    transmitting, by the wireless communication device, the one or more second packets starting from a third time point greater than or equal to the second time point;
    determining an idle time based on a difference between the second time point and the third time point;
    determining a time-on-air of the one or more second packets, wherein the time-on-air of the one or more second packets is an airtime associated with transmitting the one or more second packets;

calculating an off-air time corresponding to transmission of the one or more second packets, based on the time-on-air of the one or more second packets, the duty cycle associated with the wireless communication device, and the idle time; and holding the wireless communication device to send one or more third packets after a fourth time point, wherein the fourth time point is determined based on the third time point and a sum of the time-on-air and the calculated off-air time of the one or more second packets.

4. The method of claim 3, wherein the off-air time corresponding to transmission of the one or more second packets is calculated based on $T_{off}=T_{air}*(1/D-1)-T_{idle}$, wherein $T_{off}$ is the off-air time of the one or more second packets, $T_{air}$ is the time-on-air of the one or more second packets, D is the duty cycle associated with the wireless communication device, and $T_{idle}$ is the idle time.

5. The method of claim 3, wherein a value of the idle time is reset after transmitting the one or more third packets.

6. The method of claim 1, wherein:
the one or more first packets comprises an acknowledgement (ACK) packet; and
the wireless communication device waits for at least the off-air time associated with the transmission of the ACK packet following each transmission of an ACK packet by the wireless communication device.

7. The method of claim 1, wherein:
the one or more first packets comprises one of a Null Data Packet (NDP), a Beacon, or an ACK packet;
the wireless communication device performs early transmission of the one or more first packets by a time amount equal to an early time duration; and
the off-air time associated with transmission of the one or more first packets is extended by the time amount equal to the early time duration.

8. The method of claim 1, wherein the time-on-air for transmitting the one or more first packets is restricted to be within a maximum time-on-air, such that the time-on-air for transmitting the one or more first packets is less than or equal to the maximum time-on-air.

9. The method of claim 8, wherein the maximum time-on-air is determined based on a burst cycle duration and the duty cycle associated with the wireless communication device.

10. The method of claim 9, wherein one or more of the burst cycle duration or the maximum time-on-air is determined and configured by an application running on the wireless communication device.

11. The method of claim 9, wherein the off-air time corresponding to transmission of the one or more first packets is calculated based at least in part on subtracting the time-on-air for transmitting the first packets from the burst cycle duration.

12. The method of claim 9, wherein the duty cycle associated with the wireless communication device corresponds to a duty cycle observation window, and wherein a duration of the duty cycle observation window comprises an integer multiple of the burst cycle duration.

13. The method of claim 8, wherein:
the one or more first packets and the one or more second packets are included in a data transmission requiring an airtime greater than the maximum time-on-air; and
the data transmission is split into at least a first subset comprising the one or more first packets and a second subset comprising the one or more second packets, wherein both transmitting the first subset and transmitting the second subset requires an airtime less than or equal to the maximum time-on-air.

14. The method of claim 1, wherein the wireless communication device is silent during the off-air time, such that the wireless communication device does not perform any packet transmissions during the off-air time.

15. The method of claim 1, wherein the essential packet types include one or both of associated real-time packets or un-associated real-time packets.

16. The method of claim 1, wherein the wireless communication device is configured to:
transmit one or more of associated real-time packets, un-associated real-time packets, or non-essential packets based on a determination that the available transmission credit is greater than the reserved credit;
transmit one or more of associated real-time packets or un-associated real-time packets based on a determination that the available transmission credit is less than or equal to the reserved credit; and
transmit only associated real-time packets based on a determination that the available transmission credit is less than or equal to a real-time credit associated with the wireless communication device, wherein the reserved credit is greater than the real-time credit.

17. The method of claim 16, wherein:
the associated real-time packets include one or more of ACK packets or Beacons within a Service Set Identifier (SSID) associated with the wireless communication device or the WLAN;
the un-associated real-time packets include one or more of probe responses, association responses, or handshaking messages; and
the non-essential packets include one or more of data or management packets.

18. The method of claim 1, wherein:
the wireless communication device spreads a plurality of packet transmissions from the wireless communication device to a receiving device based on transmitting each packet transmission of the plurality of packet transmissions to be at least a minimum duration apart in time;
the minimum duration apart comprises a calculated time interval to allow the receiving device to accumulate a transmission credit to receive the packet transmissions; and
the minimum duration apart is calculated based on the time-on-air of each packet transmission and a duty cycle associated with the receiving device.

19. A wireless communication device for performing wireless communication in a Wireless Local Area Network (WLAN), the wireless communication device comprising:
a modem;
a processor, communicatively coupled with the modem; and
a memory, communicatively coupled with the processor and storing processor-readable codes that, when executed by the processor in conjunction with the modem, is configured to:
transmit one or more first packets starting from a first time point;
determine a time-on-air of the one or more first packets, wherein the time-on-air of the one or more first packets is an airtime associated with transmitting the one or more first packets;
calculate an off-air time corresponding to transmission of the one or more first packets, wherein the off-air time is calculated based on the time-on-air and a duty cycle associated with the wireless communication device;

hold the modem to send one or more second packets after a second time point, wherein the second time point is determined based on the first time point and a sum of the time-on-air and the calculated off-air time; and continuously update an available transmission credit associated with the wireless communication device, wherein the wireless communication device is configured to:

transmit any packet type of a plurality of packet types based on a determination that the available transmission credit is greater than a reserved credit associated with the wireless communication device; and transmit only essential packet types of the plurality of packet types based on a determination that the available transmission credit is less than or equal to the reserved credit.

20. The wireless communication device of claim 19, wherein the wireless communication device is a WLAN Access Point (AP) or a WLAN Station (STA).

\* \* \* \* \*